(12) United States Patent
Masuda et al.

(10) Patent No.: US 10,647,362 B2
(45) Date of Patent: May 12, 2020

(54) REAR VEHICLE-BODY STRUCTURE OF VEHICLE

(71) Applicant: MAZDA MOTOR CORPORATION, Hiroshima (JP)

(72) Inventors: Akiyoshi Masuda, Aki-gun (JP); Shin Murata, Nagoya (JP); Mitsuo Iwano, Higashihiroshima (JP); Yasutomo Abe, Hiroshima (JP); Shigeaki Watanabe, Hiroshima (JP); Hideyuki Tsukamoto, Hiroshima (JP); Hidenori Matsuoka, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 157 days.

(21) Appl. No.: 15/906,257

(22) Filed: Feb. 27, 2018

(65) Prior Publication Data

US 2018/0273108 A1  Sep. 27, 2018

(30) Foreign Application Priority Data

Mar. 27, 2017  (JP) .................................. 2017-061760
Dec. 4, 2017  (JP) .................................. 2017-232836

(51) Int. Cl.
*B62D 25/08* (2006.01)
*B62D 25/16* (2006.01)
(Continued)

(52) U.S. Cl.
CPC ......... *B62D 25/088* (2013.01); *B60G 15/062* (2013.01); *B60G 15/067* (2013.01);
(Continued)

(58) Field of Classification Search
CPC .... B62D 25/088; B62D 27/023; B62D 25/16; B62D 25/02; B60G 15/067; B60G 15/062;
(Continued)

(56) References Cited

U.S. PATENT DOCUMENTS 5,788,322 A * 8/1998 Wolf .................... B62D 25/088
296/181.4
6,648,401 B2 * 11/2003 Behnke ................ B62D 25/088
296/198

(Continued)

FOREIGN PATENT DOCUMENTS

JP  2003-137140 A  5/2003
JP  2009-137374 A  6/2009

*Primary Examiner* — Drew J Brown
(74) *Attorney, Agent, or Firm* — Studebaker & Brackett PC

(57) ABSTRACT

A rear vehicle-body structure of a vehicle comprises a wheel house provided at a side face portion of a vehicle-body rear portion, a side frame extending in a vehicle longitudinal direction on an inward side, in a vehicle width direction, of the wheel house, a suspension comprising a damper provided to extend in a vehicle vertical direction for damping a vertical load inputted from a wheel thereto and a bump stopper provided on a shaft center of the damper, and a suspension housing including a support face portion for supporting the damper and provided to connect the side frame and the wheel house, wherein the suspension housing comprises a peripheral wall portion which is provided to extend downward from the support face portion and enclose the bump stopper at least partially.

16 Claims, 22 Drawing Sheets

(51) Int. Cl.
  *B60G 15/06* (2006.01)
  *B62D 27/02* (2006.01)
  *B62D 25/02* (2006.01)
(52) U.S. Cl.
  CPC .............. *B62D 25/02* (2013.01); *B62D 25/16* (2013.01); *B62D 27/023* (2013.01); *B60G 2202/312* (2013.01); *B60G 2204/124* (2013.01); *B60G 2204/125* (2013.01); *B60G 2204/128* (2013.01); *B60G 2204/4502* (2013.01)

(58) Field of Classification Search
  CPC ........ B60G 2204/128; B60G 2204/124; B60G 2204/125; B60G 2202/312; B60G 2204/4502
  See application file for complete search history.

(56) References Cited

U.S. PATENT DOCUMENTS

| | | | |
|---|---|---|---|
| 7,021,703 B2* | 4/2006 | Yamaguchi | B60G 15/067 296/203.02 |
| 7,281,756 B2* | 10/2007 | Fukushi | B62D 25/084 296/203.04 |
| 7,926,869 B2* | 4/2011 | Kim | B62D 25/087 180/312 |
| 8,276,926 B2* | 10/2012 | Koyama | B62D 25/088 280/124.109 |
| 2010/0133879 A1* | 6/2010 | Leonetti | B62D 25/088 296/193.08 |
| 2017/0174265 A1* | 6/2017 | Maruyama | B62D 21/02 |
| 2017/0197664 A1* | 7/2017 | Yoshida | B62D 21/02 |
| 2017/0197665 A1* | 7/2017 | Kabayama | B62D 25/088 |
| 2018/0105004 A1* | 4/2018 | Miwa | B60G 11/16 |
| 2018/0273110 A1* | 9/2018 | Masuda | B62D 25/02 |
| 2018/0354559 A1* | 12/2018 | Nakauchi | B62D 25/088 |
| 2018/0362095 A1* | 12/2018 | Haas | B62D 25/082 |
| 2019/0009830 A1* | 1/2019 | Kondo | B62D 25/088 |
| 2019/0092394 A1* | 3/2019 | Masuda | B62D 25/088 |

* cited by examiner

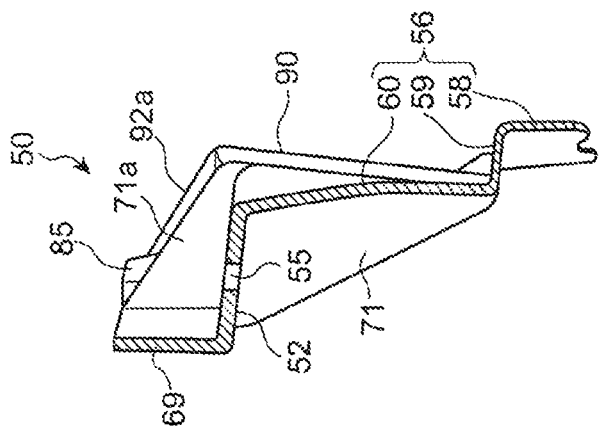
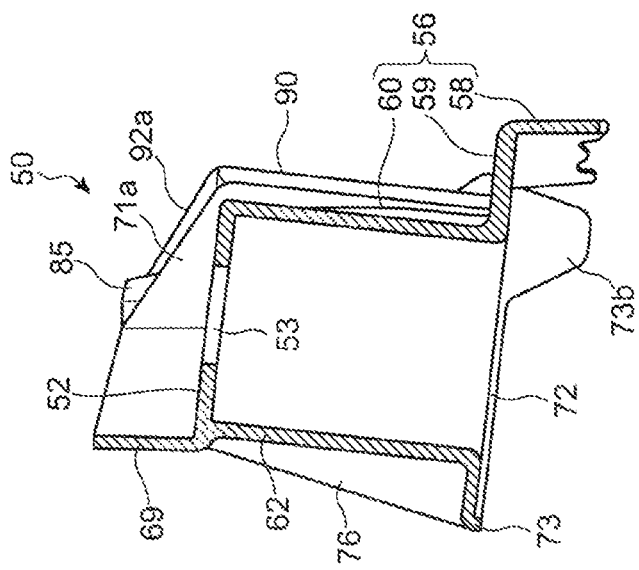
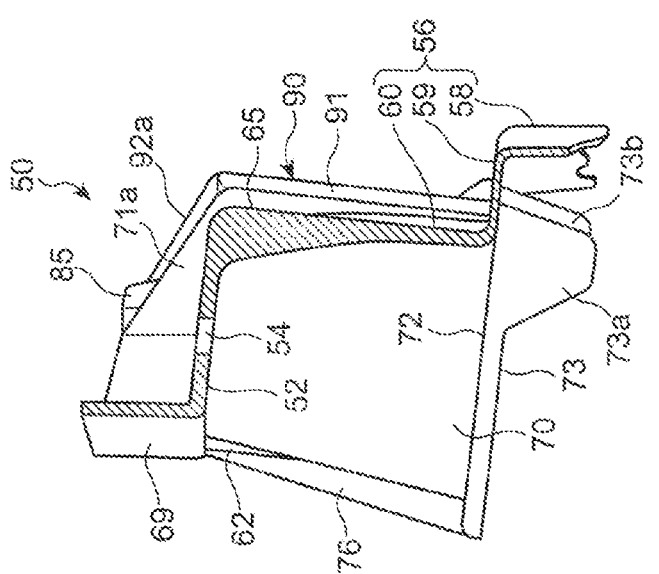

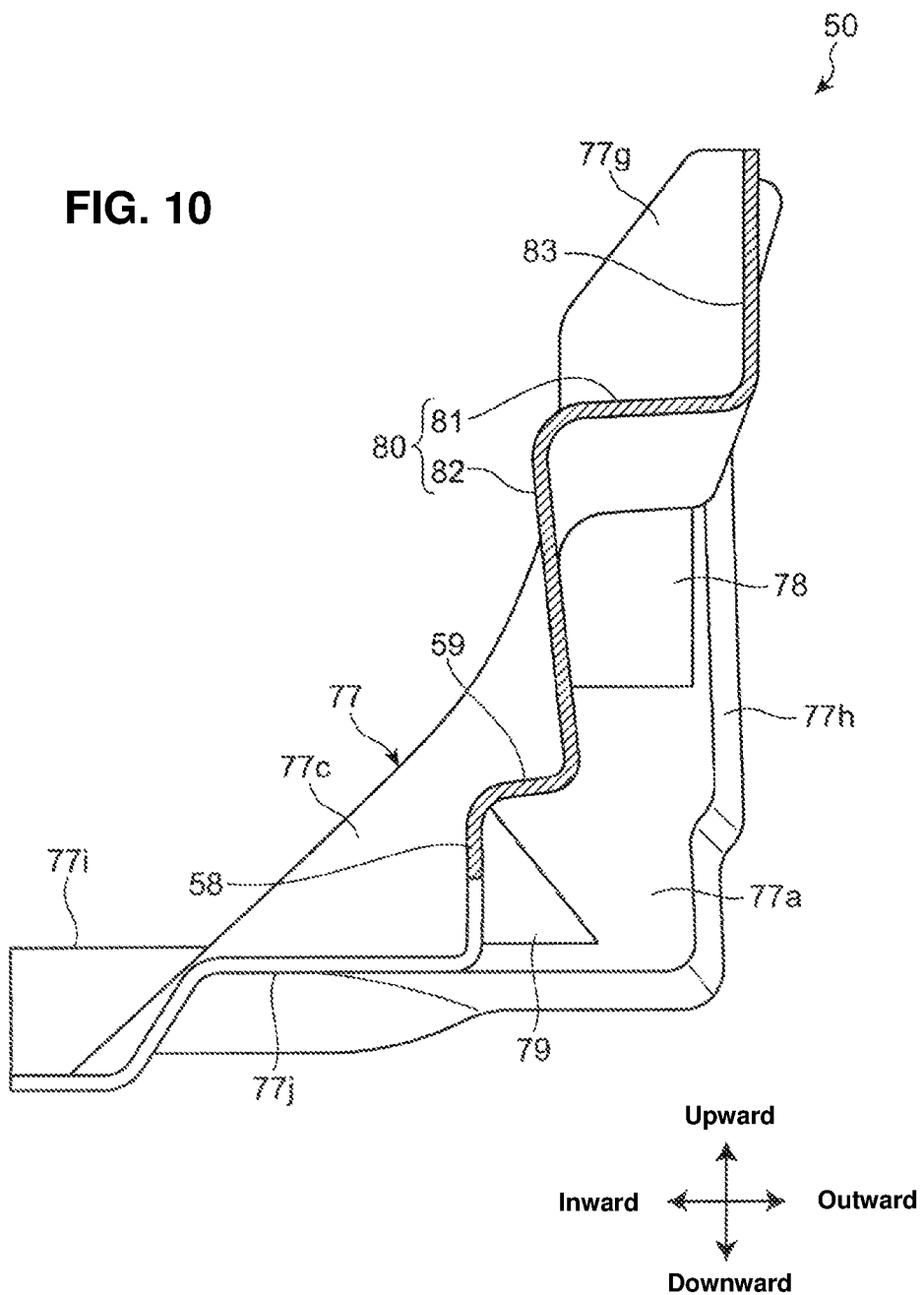

FIG. 11
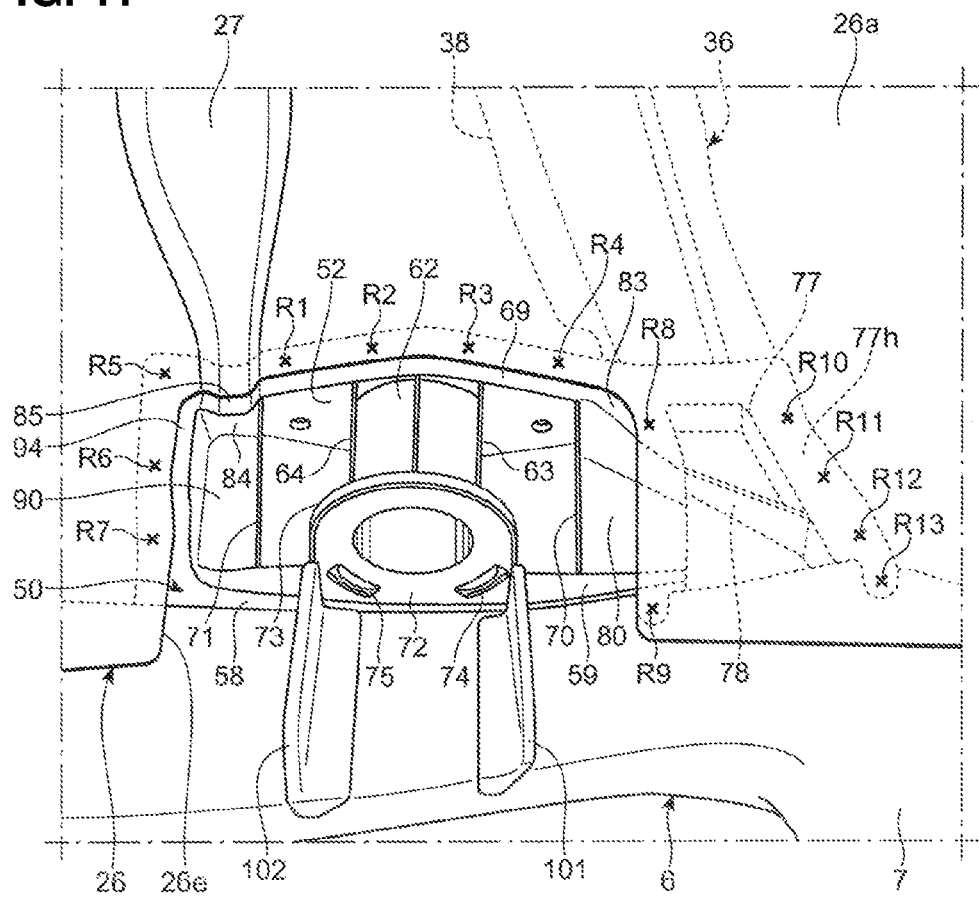
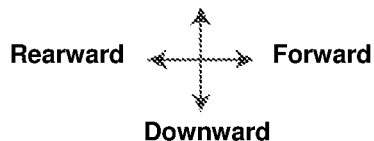

FIG. 12
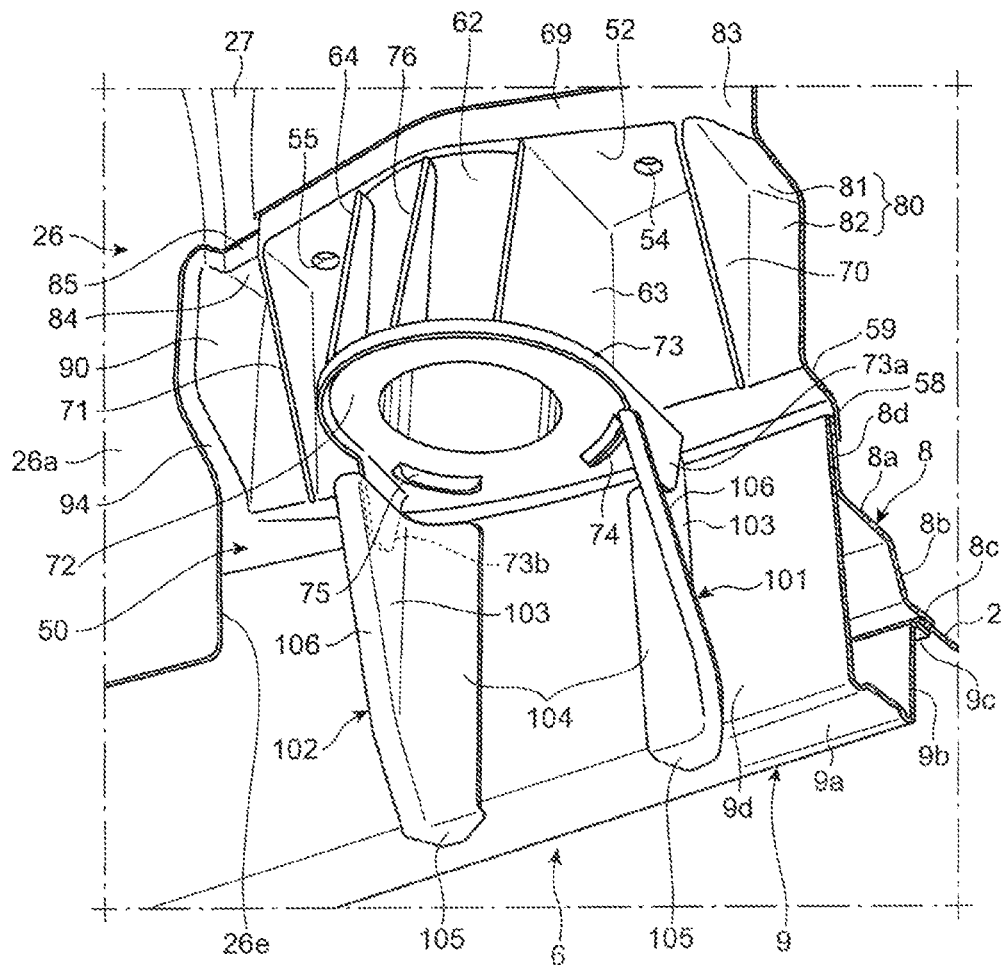
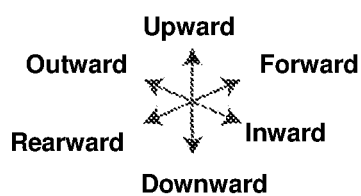

FIG. 13
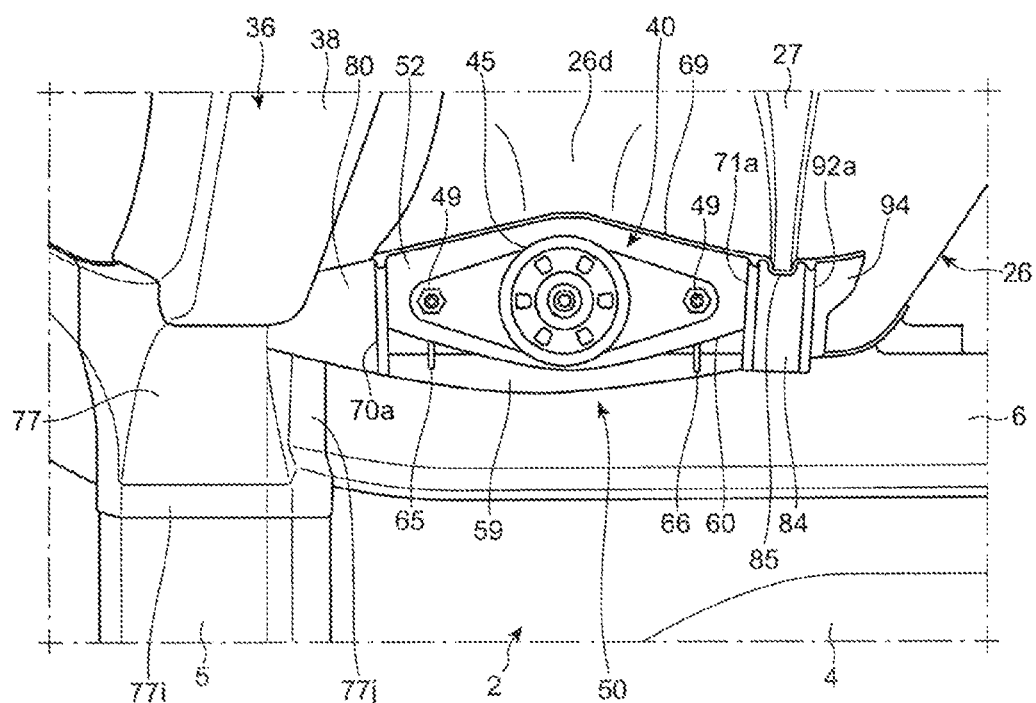
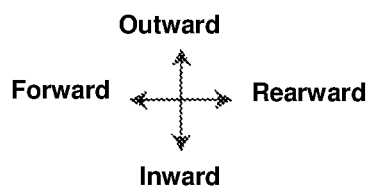

REAR VEHICLE-BODY STRUCTURE OF VEHICLE

BACKGROUND OF THE INVENTION

The present invention relates to a rear vehicle-body structure of a vehicle which comprises a suspension housing.

There is a case where at a vehicle-body rear portion is provided a suspension housing for supporting an upper end portion of a damper of a suspension between a side frame extending in a vehicle longitudinal direction and a wheel house housing a rear wheel. In this type of vehicle-body structure, a load inputted to the suspension housing from the damper during bumping of the rear wheel is dispersed to respective portions of the vehicle-body rear portion by way of the side frame and the wheel house.

In a case where the damper of the suspension which comprises a cylinder connected to a wheel side and a piston rod connected to a vehicle-body side is used, a tubal bump stopper which is made of urethane or rubber may be fitted to an outer periphery of the piston rod at an upward side of the cylinder. In this case, since the bump stopper is interposed between the cylinder and the vehicle body, it is avoided that the cylinder directly hits against the vehicle body when the damper contracts greatly, so that hitting impact can be reduced.

In general, since this type of suspension is provided with a tubal bump-stopper housing for housing the bump stopper, it is suppressed that foreign substances or water come in, so that the bump stopper and the damper can be protected.

In a case where this type of suspension is attached to a support face portion of the above-described suspension housing, a vertical wall portion which extends downward from an inward-side edge portion, in a vehicle width direction, of the support face portion of the suspension housing is provided to be spaced, toward an inside of a cabin, apart from the bump-stopper housing of the suspension. Accordingly, the vertical wall portion of the suspension housing comes into a space of the cabin, such as a baggage-room space which is provided at the vehicle-body rear portion, greatly in accordance with a position, in the vehicle width direction, of the damper or an inclination of the damper, so that the cabin space may be reduced.

Meanwhile, as disclosed in Japanese Patent Laid-Open Publication No. 2003-137140, there is a case where the suspension is supported between the side frame and the wheel house, not providing the suspension housing.

In a vehicle-body structure of the above-described patent document, a lower end portion of a bump-stopper housing of a suspension is fixed to a bracket which is arranged adjacently to an outward-side, in the vehicle width direction, of a side frame along a floor panel, and the bump stopper housing is provided to be exposed to the cabin space. Further, a spring is provided coaxially with the damper in this suspension, and an upper end portion of the spring is supported at a spring seat which is provided at the lower end portion of the bump-stopper housing in this suspension.

In the vehicle-body structure disclosed in the above-described patent document, however, loads inputted from the damper and the spring of the suspension easily concentrate on the above-described bracket, so that some reinforcing countermeasures, such as making the bracket of a thick member, may be required.

SUMMARY OF THE INVENTION

Accordingly, an object of the present invention is to effectively disperse the loads inputted from the suspension and also properly secure the cabin space.

The present invention is a rear vehicle-body structure of a vehicle, comprising a wheel house provided at a side face portion of a vehicle-body rear portion, a side frame extending in a vehicle longitudinal direction on an inward side, in a vehicle width direction, of the wheel house, a suspension comprising a damper provided to extend in a vehicle vertical direction for damping a vertical load inputted from a wheel thereto and a bump stopper provided on a shaft center of the damper, and a suspension housing including a support face portion for supporting the damper and provided to connect the side frame and the wheel house, wherein the suspension housing comprises a peripheral wall portion which is provided to extend downward from the support face portion and enclose the bump stopper at least partially.

According to the present invention, since the support face portion of the suspension housing is reinforced by the peripheral wall portion from a downward side of a vehicle body, a surface rigidity of the support face portion is increased and also the load inputted to the support face portion from the damper of the suspension is effectively dispersed to respective portions of the vehicle-body rear portion by way of the side frame and the wheel house. Accordingly, local deformation which may be caused by a load concentration on the support face portion of the suspension housing during bumping of the rear wheel can be suppressed effectively. Further, since the bump stopper of the suspension can be housed by the peripheral wall portion of the suspension housing, a bump-stopper housing which is conventionally used as exclusive parts of the suspension can be omitted. Therefore, compared with a conventional vehicle-body structure in which the vertical wall portion of the suspension housing is provided to be spaced inward, in the vehicle width direction, apart from the bump-stopper housing of the suspension, the vertical wall portion of the suspension housing can be arranged closely to the bump stopper which is positioned on the outward side, in the vehicle width direction, of the vertical wall portion. Accordingly, the protrusion quantity of the suspension housing toward the cabin inside is so reduced that the cabin space, such as the baggage-room space, can be secured properly at the vehicle-body rear portion.

In an embodiment of the present invention, the peripheral wall portion is of a cylindrical shape which extends in the vehicle vertical direction. According to this embodiment, the bump stopper can be housed by the cylindrical peripheral wall portion which is compact in a radical direction.

In another embodiment of the present invention, the suspension housing comprises a front wall portion and a rear wall portion which respectively extend downward from the support face portion, the front wall portion is arranged along a tangential direction at a front end of the peripheral wall portion, when viewed from an axial direction of the peripheral wall portion, and the rear wall portion is arranged along a tangential direction at a rear end of the peripheral wall portion, when viewed from the axial direction of the peripheral wall portion. According to this embodiment, since the support face portion of the suspension housing is reinforced by the front wall portion and the rear wall portion as well, in addition to the peripheral wall portion, from the downward side of the vehicle body, the surface rigidity of the support face portion can be further improved.

In another embodiment of the present invention, the suspension comprises a spring which is arranged around the damper, and a spring receiving portion for supporting an upper end portion of the damper is provided at a lower end portion of the peripheral wall portion. According to this embodiment, the upper end portion of the spring of the suspension can be supported by utilizing the spring receiving portion provided at the lower end portion of the peripheral wall portion at the suspension housing. Further, since the load inputted to the spring receiving portion from the spring is dispersed to the upward side of the vehicle body by way of the peripheral wall portion, local deformation of the spring receiving portion caused by a stress concentration can be suppressed, so that the high support strength of the spring can be provided by the spring receiving portion.

In another embodiment of the present invention, the spring receiving portion is provided to expand radically outside from a lower edge of the peripheral wall portion in a flange shape, and a high-rigidity portion is provided along a peripheral edge portion of the spring receiving portion. According to this embodiment, since the surface rigidity of the flange-shaped spring receiving portion is increased by the high-rigidity portion provided along the peripheral edge portion of the spring receiving portion, the support strength of the spring by the spring receiving portion can be further improved.

In another embodiment of the present invention, a connection portion of the suspension housing to the side frame includes an upper-face joint portion which is joined to an upper face of the side frame. According to this embodiment, since the upper-face joint portion of the suspension housing is joined to the upper face of the side frame, the suspension housing can be connected to the side frame securely. Further, relative displacement of the suspension housing to the upper face of the side frame can be effectively controlled (restricted). Thereby, the effect of suppressing deformation of the suspension housing falling down toward the cabin inside (inward falling-down deformation of the suspension housing) can be increased.

In another embodiment of the present invention, the suspension housing further comprises a vertical wall portion which extends upward from an outward-side edge portion, in the vehicle width direction, of the upper-face joint portion up to an inward-side edge portion, in the vehicle width direction, of the support face portion and a high-rigidity portion which is provided at an area from the upper-face joint portion to the vertical wall portion. According to this embodiment, since the high-rigidity portion is provided at the area from the upper-face joint portion of the suspension housing to the vertical wall portion extending upward from the outward-side edge portion of the upper-face joint portion, bending deformation of a corner portion between the upper-face joint portion and the vertical wall portion can be suppressed effectively. Accordingly, the inward falling-down deformation of the suspension housing can be effectively suppressed.

In another embodiment of the present invention, the vertical wall portion comprises a lower-side vertical wall portion which extends upward from the outward-side edge portion, in the vehicle width direction, of the upper-face joint portion, a middle-level floor portion which extends outward, in the vehicle width direction, from an upper edge portion of the lower-side vertical wall portion and is continuous to a lower edge portion of the peripheral wall portion, an upper-side vertical wall portion which extends upward from the middle-level floor portion up to the support face portion, and a reinforcing portion which is provided at an area from the middle-level floor portion to an outer peripheral face of the peripheral wall portion. According to this embodiment, in a case where the vertical wall portion of the suspension housing is configured in a step-shaped structure in which the middle-level floor portion which is continuous to the lower edge portion of the peripheral wall portion is provided, the reinforcing portion is provided at the area from the middle-level floor portion to the outer peripheral face of the peripheral wall portion. Thereby, the bending deformation of the suspension housing at the corner portion between the middle-level floor portion and the lower edge portion of the peripheral wall portion can be effectively suppressed. Accordingly, the inward falling-down deformation of the suspension housing can be suppressed more properly.

In another embodiment of the present invention, the lower-side vertical wall portion is provided to slant upward and outward. According to this embodiment, bending deformation of the suspension housing at a corner portion between the upper-face joint portion and the lower-side vertical wall portion can be suppressed effectively, compared to a case where the lower-side vertical wall portion is not configured to slant. Further, inward displacement of an upper-side portion of the suspension housing which is positioned above the lower-side vertical wall portion can be easily controlled (restricted) by the lower-side vertical wall portion. Accordingly, the inward falling-down deformation of the suspension housing can be suppressed further properly.

In another embodiment of the present invention, a portion of the middle-level floor portion is a spring receiving portion for receiving a spring of the suspension from an upward side of a vehicle body, and the reinforcing portion is a rising portion which is configured such that a portion of the spring receiving portion rises. According to this embodiment, the suppression effect of the inward falling-down deformation of the suspension housing can be increased by utilizing the above-described rising portion.

In another embodiment of the present invention, the lower-side vertical wall portion includes an upward extension portion which extends upward beyond the middle-level floor portion and forms a portion of the rising portion. According to this embodiment, reinforcing between the middle-level floor portion and the peripheral wall portion can be attained with a simple structure by using the above-described rising portion which is configured by utilizing the upward extension portion of the lower-side vertical wall portion.

Herein, the "high-rigidity portion" used in the description of the present invention means a portion which is configured such that this portion is not easily deformed, compared to its surrounding portion. As a specific example of the "high-rigidity portion," a convex portion, a concave (recess, depression) portion, a rib, a thick portion, or the like may be applied.

Other features, aspects, and advantages of the present invention will become apparent from the following description which refers to the accompanying drawings.

BRIEF DESCRIPTION OF THE DRAWINGS

FIGS. 9A, 9B and 9C are sectional views taken along line C-C, D-D, and E-E of the suspension housing shown in FIG. 6, when viewed from the forward side of the vehicle body.

FIG. 10 is a sectional view taken along line F-F of the suspension housing shown in FIG. 6, when viewed from a rearward side of the vehicle body.

FIG. 11 is a perspective view of a connection portion of the suspension housing and a wheel house inner and its surrounding portion, when viewed from an obliquely-downward side outside the cabin.

FIG. 12 is a perspective view of a connection portion of the suspension housing and a side frame and its surrounding portion, when viewed from an obliquely-forward side outside the cabin.

FIG. 13 is a plan view of the suspension housing and its surrounding portion, when viewed from the upward side of the vehicle body.

DETAILED DESCRIPTION OF THE INVENTION

Hereafter, each rear vehicle-body structure of a vehicle according to embodiments of the present invention will be described referring to the accompanying drawings. While each figure of the accompanying drawings shows one side (right side), in a vehicle width direction, of a vehicle-body structure of a vehicle, the other side (left side) is configured similarly. Further, forward/rearward, inward/outward, and upward/downward directions shown in each figure of the accompanying drawings mean a vehicle longitudinal direction, a vehicle width direction, and a vehicle vertical direction, respectively.

Embodiment 1

A rear vehicle-body structure of a vehicle according to a first embodiment will be described referring to FIGS. 1-16.

[Whole Structure]

Figure 1:
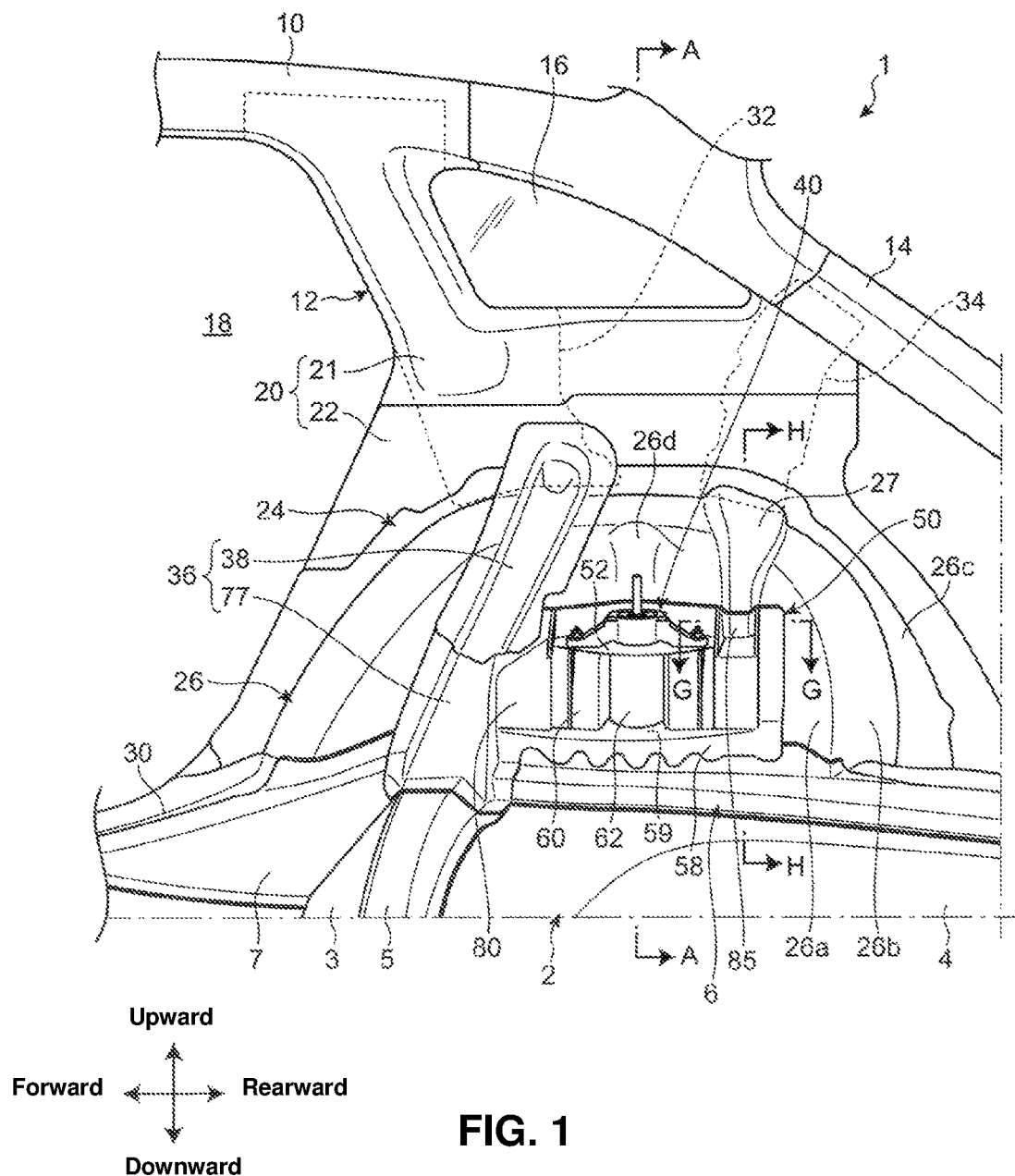
FIG. 1 is a perspective view of a rear vehicle-body structure of a vehicle according to a first embodiment of the present invention, when viewed from an inside of a cabin.
Figure 2:
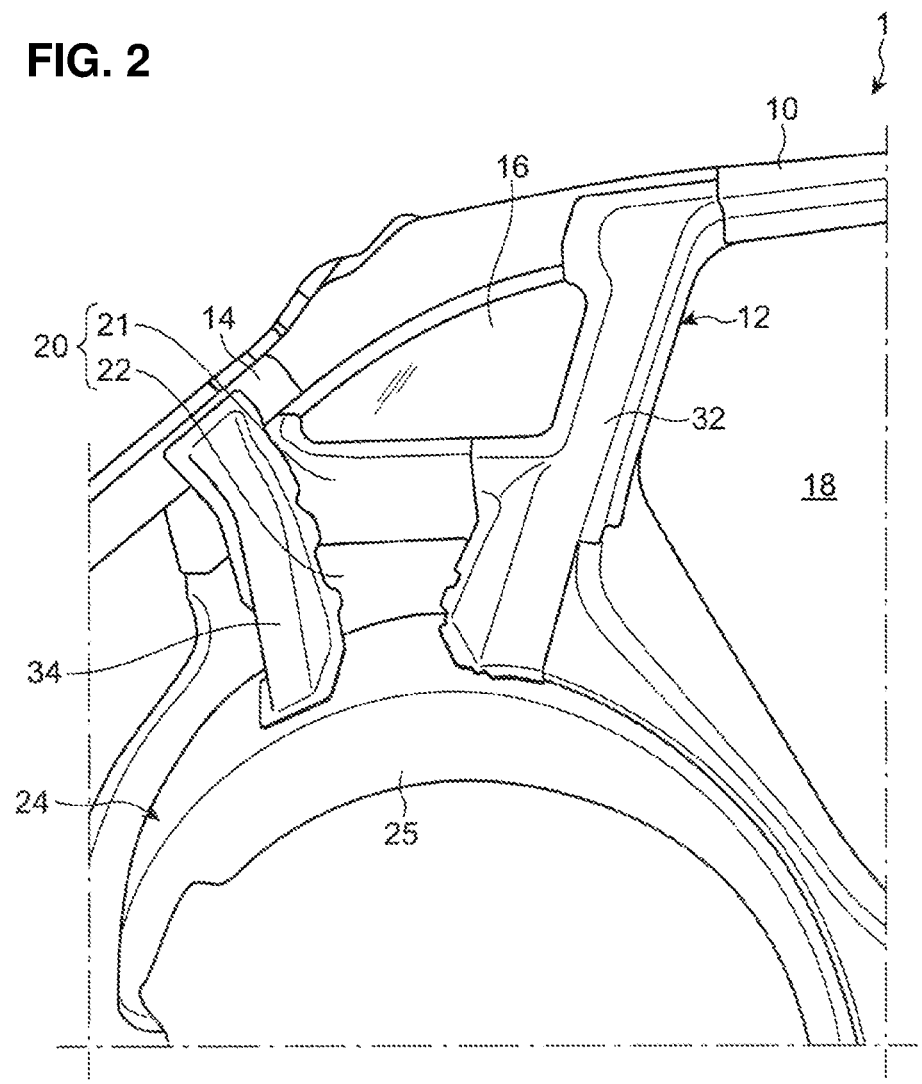
FIG. 2 is a side view of the rear vehicle-body structure, when viewed from an outside of the cabin.

As shown in FIGS. 1 and 2, an automotive vehicle 1 which is provided with the rear vehicle-body structure of the vehicle according to an embodiment comprises a floor panel 2 which forms a floor portion of a space in a cabin, a side frame 6 which extends in a vehicle longitudinal direction along an outward-side edge portion, in a vehicle width direction, of the floor panel 2, a roof side rail 10 which extends in the vehicle longitudinal direction along an outward-side edge portion, in the vehicle width direction, of a roof panel (not illustrated), and plural pillar portions 12, 14 which extend downward from the roof side rail 10.

The side frame 6, the roof side rail 10, and the pillar portions 12, 14 are provided at each of both sides of the vehicle body, respectively, but each figure of the accompanying drawings illustrates only the members 6, 10, 12, 14 provided on the right side of the vehicle body.

A slant portion 3 is provided at the floor panel 2 such that a level of a floor surface of a vehicle-body rearward-side portion is higher than that of a floor surface of a vehicle-body forward-side portion. Thus, a floor surface of a baggage-room space which is positioned on a vehicle-body rearward side is arranged at a higher level than a floor surface of a passenger-room space. A tire pan 4 which protrudes downward is provided at a portion of the floor panel 2 which is positioned in back of the slant portion 3, i.e., a portion which forms a floor portion of the baggage-room space.

A kick-up portion 7 which slants obliquely upward and rearward is provided at the side frame 6 such that the kick-up portion 7 matches the slant portion 3 of the floor panel 2. A cross member 5 which extends in the vehicle width direction is provided between right-and-left side frames 6. An end portion, in the vehicle width direction, of the cross member 5 is connected to a rear end portion of the kick-up portion 7.

The cross member 5 is arranged along the floor panel 2, and a closed cross section which extends continuously in the vehicle width direction is formed between the cross member 5 and the floor panel 2. Thereby, load transmission between the right-and-left side frames 6 can be effectively conducted via the cross member 5.

Figure 3:
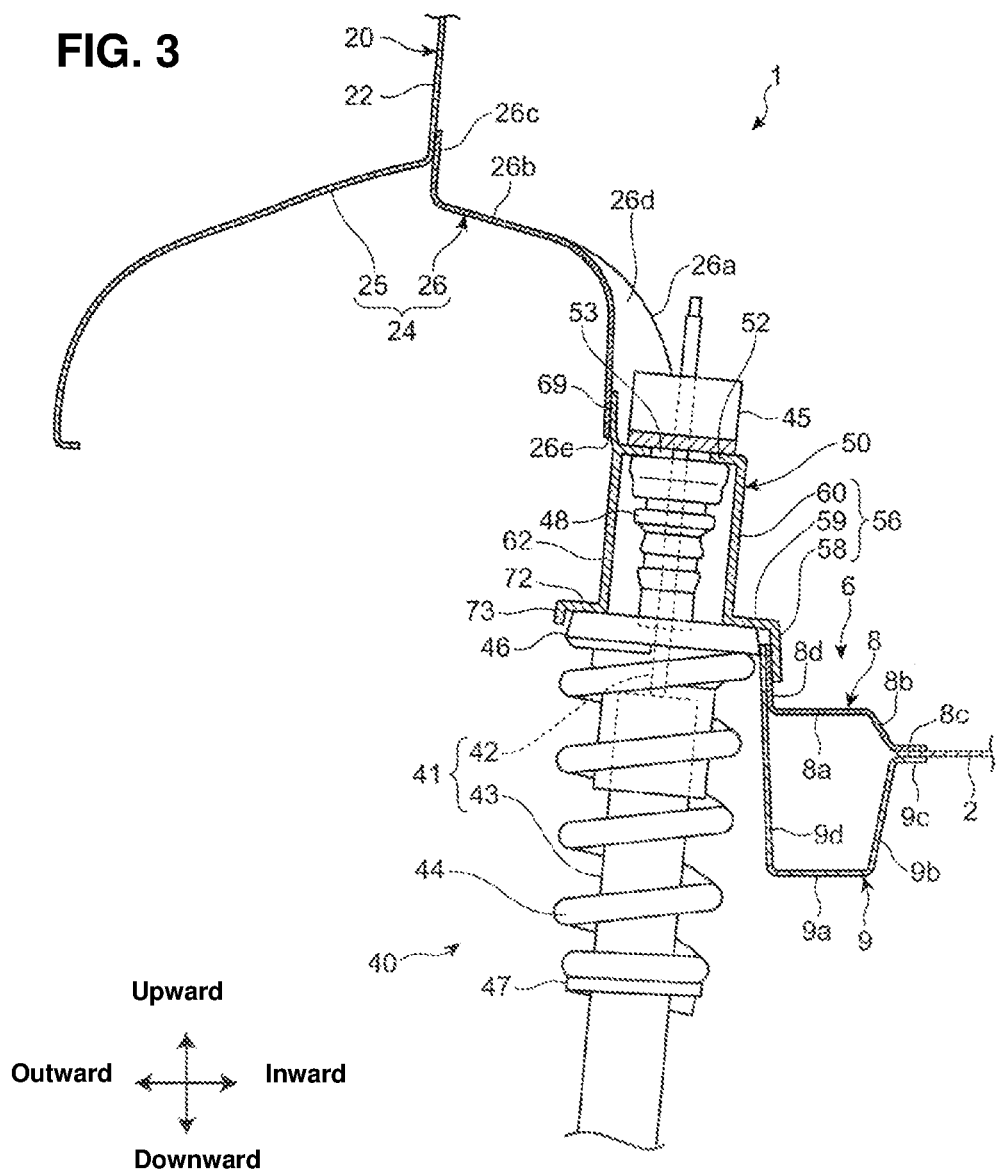
FIG. 3 is a sectional view taken along line A-A of the rear vehicle-body structure shown in FIG. 1, when viewed from a forward side of a vehicle body.

As shown in the sectional view of FIG. 3, the side frame 6 comprises an upper frame member 8 and a lower frame member 9 which are joined mutually. The upper frame member 8 and the lower frame member 9 are made of a metal plate, such as a steel plate, by press forming, for example.

The upper frame member 8 comprises an upper wall portion 8a which forms an upper face of the side frame 6, an inward-side wall portion 8b which extends downward from an inward-side edge portion, in the vehicle width direction, of the upper wall portion 8a, a flange portion 8c which extends toward an inward side, in the vehicle width direction, of the vehicle body from a lower edge portion of the inward-side wall portion 8b, and an outward-side wall portion 8*d* which extends upward from an outward-side edge portion, in the vehicle width direction, of the upper wall portion 8*a*.

The lower frame member 9 comprises a lower wall portion 9*a* which forms a lower face of the side frame 6, facing a lower side of the upper wall portion 8*a* of the upper frame member 8, an inward-side wall portion 9*b* which extends upward from an inward-side edge portion, in the vehicle width direction, of the lower wall portion 9*a*, a flange portion 9*c* which extends toward the inward side, in the vehicle width direction, of the vehicle body from an upper edge portion of the inward-side wall portion 9*b*, and an outward-side wall portion 9*d* which extends upward from an inward-side edge portion, in the vehicle width direction, of the lower wall portion 9*a*.

The flange portion 9*c* of the lower frame member 9 is provided to overlap a lower face of the flange portion 8*c* of the upper frame member 8, interposing the floor panel 2 between the flange portion 9*c* and the flange portion 8*c*. These members 8*c*, 2, 9*c* are joined together in a three-layer manner by welding, for example.

The outward-side wall portion 9*d* of the lower frame member 9 is provided to face respective outward sides, in the vehicle width direction, of the outward-side wall portion 9*d*, the outward-side wall portion 8*d* and the inward-side wall portion 8*b* of the upper frame member 8, and the inward-side wall portion 9*b* of the lower frame member 9*a*. An upper edge portion of the outward-side wall portion 9*d* is provided to overlap an outward-side face, in the vehicle width direction, of the outward-side wall portion 8*d* of the upper frame member 8, and joined to the outward-side wall portion 8*d* by welding, for example.

The side frame 6 which is configured as described above has a closed cross section extending in the vehicle longitudinal direction which is formed between the upper frame member 8 and the lower frame member 9.

An a pillar (front pillar) and a B pillar (center pillar), which are not illustrated, and a C pillar (quarter pillar) and a D pillar (rear pillar), which are shown in FIGS. 1 and 2, as plural pillar portions, are arranged in order from the forward side of the vehicle body. As shown in FIGS. 1 and 2, a quarter window 16 is provided between the C pillar 12 and the D pillar 14, and a rear-door opening portion 18 for rear seat's ingress/egress is provided between the C pillar 12 and the B pillar (not illustrated).

The automotive vehicle 1 comprises a side panel 20 which constitutes a side face portion of the vehicle body at a position located rearward closely to the rear-door opening portion 18 and a wheel house 24 for a rear wheel which is provided along a lower edge of the side panel 20. Front lower end portions of the side panel 20 and the wheel house 24 are connected to a rear end portion of a side sill 30 (see FIG. 1) which extends in the vehicle longitudinal direction.

The side panel 20 comprises an upper panel 21 and a lower panel 22 which are arranged continuously in the vehicle vertical direction. A lower end portion of the upper panel 21 and an upper end portion of the lower panel 22 are joined mutually by welding, for example.

The wheel house 24 comprises a wheel house outer 25 (see FIG. 2) which protrudes toward the outward side, in the vehicle width direction, of the vehicle body from the side panel 20 and a wheel house inner 26 (see FIG. 1) which protrudes toward the inward side, in the vehicle width direction, of the vehicle body from the side panel 20.

The wheel house outer 25 and the wheel house inner 26 are respectively made of the metal plate, such as the steel plate, by press forming, for example. As shown in FIG. 3, the wheel house outer 25 is provided integrally with the lower panel 22 of the side panel 20. The wheel house inner 26 is joined to an inside face of the cabin of the lower panel 22 by welding, for example.

As shown in FIG. 2, the C pillar 12 comprises an outer pillar member 32 which extends in the vehicle vertical direction. The outer pillar member 32 is a member which has a hat-shaped cross section which opens to the inward side, in the vehicle width direction, of the vehicle body, for example. The outer pillar member 32 is provided such that its opening portion is closed with the side panel 20 (see FIG. 1), and joined to a cabin-outside face of the side panel 20 by welding, for example. Thereby, a closed cross section of the C pillar 12 which extends continuously in the vehicle vertical direction is formed by the outer pillar member 32 and the side panel 20.

An upper end portion of the outer pillar member 32 is joined to the roof side rail 10 by welding, for example, and a lower end portion of the outer pillar member 32 is joined to an upper face portion of the wheel house outer 25 by welding, for example. Thus, the C pillar 12 connects the wheel house 24 and the roof side rail 10, thereby performing the load transmission function between them.

Further, an outward-side reinforcing member 34 which extends in the vehicle vertical direction on the rearward side of the C pillar 12 is joined to a cabin-outside face of the side panel 20 by welding, for example. The outward-side reinforcing member 34 is a member having a hat-shaped cross section which opens to the inward side, in the vehicle width direction, of the vehicle body, and forms a closed cross section extending continuously in the vehicle vertical direction together with the side panel 20.

The outward-side reinforcing member 34 is joined to an upper face portion of the wheel house outer 25 at its lower end portion by welding, for example, and also joined to the D pillar 14 at its upper end portion by welding, for example. Thus, the outward-side reinforcing member 34 which connects the wheel house outer 25 and the D pillar 14 is a load transmitting member to perform the load transmission function between the wheel house 24 and the D pillar 14.

[Wheel House Inner]

As shown in FIGS. 1 and 3, the wheel house inner 26 comprises a vertical wall portion 26*a* which is arranged adjacently to an outward side, in the vehicle with direction, of the side frame 6 and is of a roughly semicircular shape in a vehicle-body side view, a peripheral wall portion 26*b* which extends toward the outward side of the vehicle body from a peripheral edge portion of the vertical wall portion 26*a*, and a flange portion 26*c* which expands radically outside from a peripheral edge portion of an outward side of the peripheral wall portion 26*b*. The flange portion 26*c* is joined to the lower panel 22 by welding, for example.

A recess (depression) portion 26*d* which is recessed (depressed) toward the outward side, in the vehicle width direction, of the vehicle body is provided at a central portion, in the vehicle longitudinal direction, of the vertical wall portion 26*a* of the wheel house inner 26 in a groove shape extending in the vehicle vertical direction. A cutout 26*e* (see FIGS. 11 and 12) is provided at a lower edge portion of the vertical wall portion 26*a*. In FIGS. 11 and 12, illustration of the suspension 40 is omitted.

The suspension housing 50 is joined to the wheel house inner 26 such that the cutout 26*e* is closed with this member 50 from the inward side. The structure of the suspension housing 50 will be described later.

Figure 14:
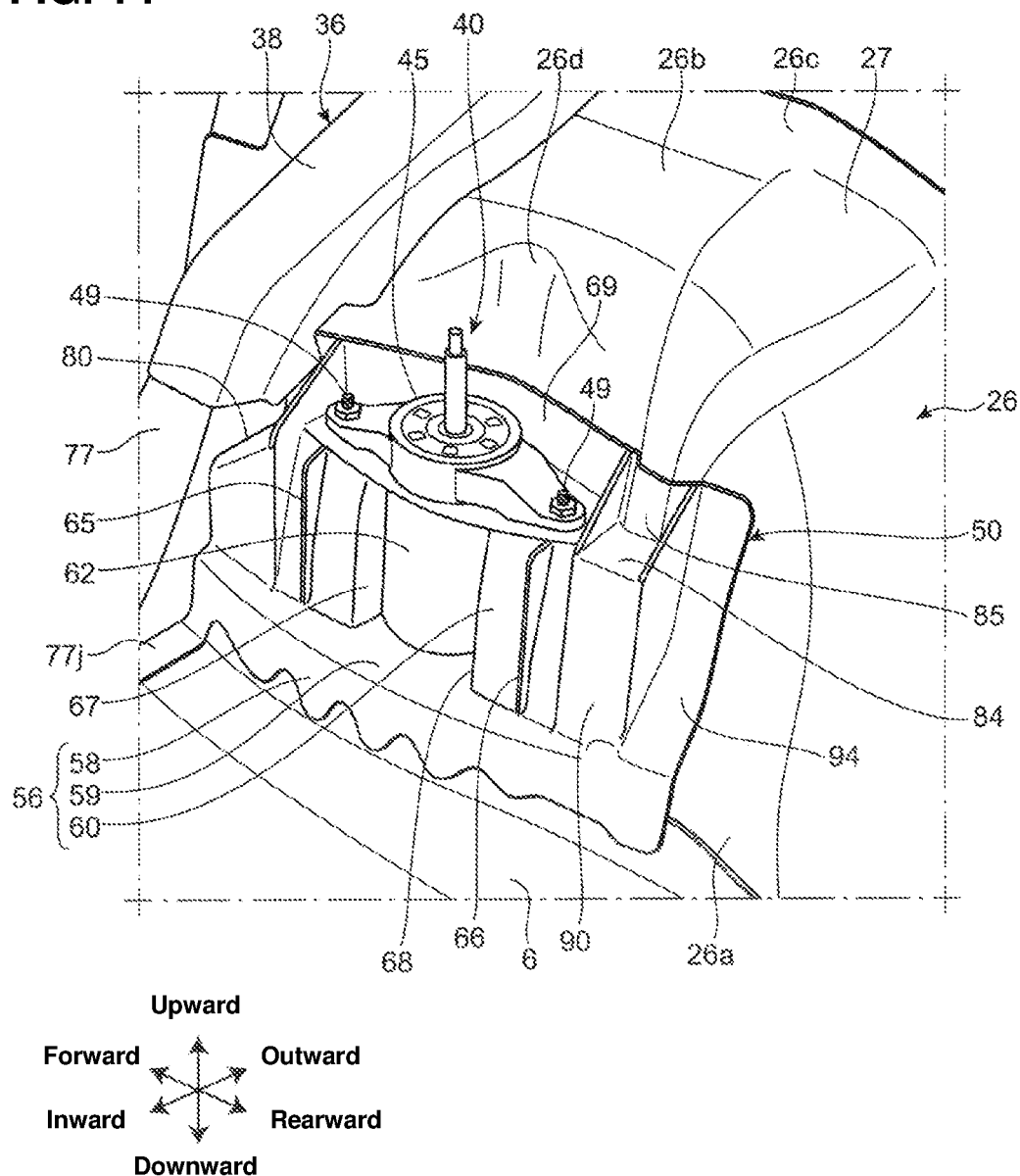
FIG. 14 is a perspective view of a rear-side load transmission portion of the suspension housing and its surrounding portion, when viewed from an obliquely-rearward side inside the cabin.

As shown in FIGS. 1 and 14, a load transmission portion 27 which extends upward and outward is provided at the wheel house inner 26. The load transmission portion 27 is formed integrally with the wheel house inner 26 such that this portion 27 protrudes toward the cabin inside from the vertical wall portion 26*a* and the peripheral wall portion 26*b*.

The load transmission portion 27 is arranged on the rearward side of the recess portion 26*d* of the vertical wall portion 26*a*. The load transmission portion 27 extends upward from the central portion, in the vehicle vertical direction, of the vertical wall portion 26*a* along the vertical wall portion 26*a* up to a corner portion between the vertical wall portion 26*a* and the peripheral wall portion 26*b*, and further extends outward from the corner portion along the vertical wall portion 26*a* up to the flange portion 26*c*. The width of the load transmission portion 27 becomes gradually larger toward its upper end side.

Figure 15:
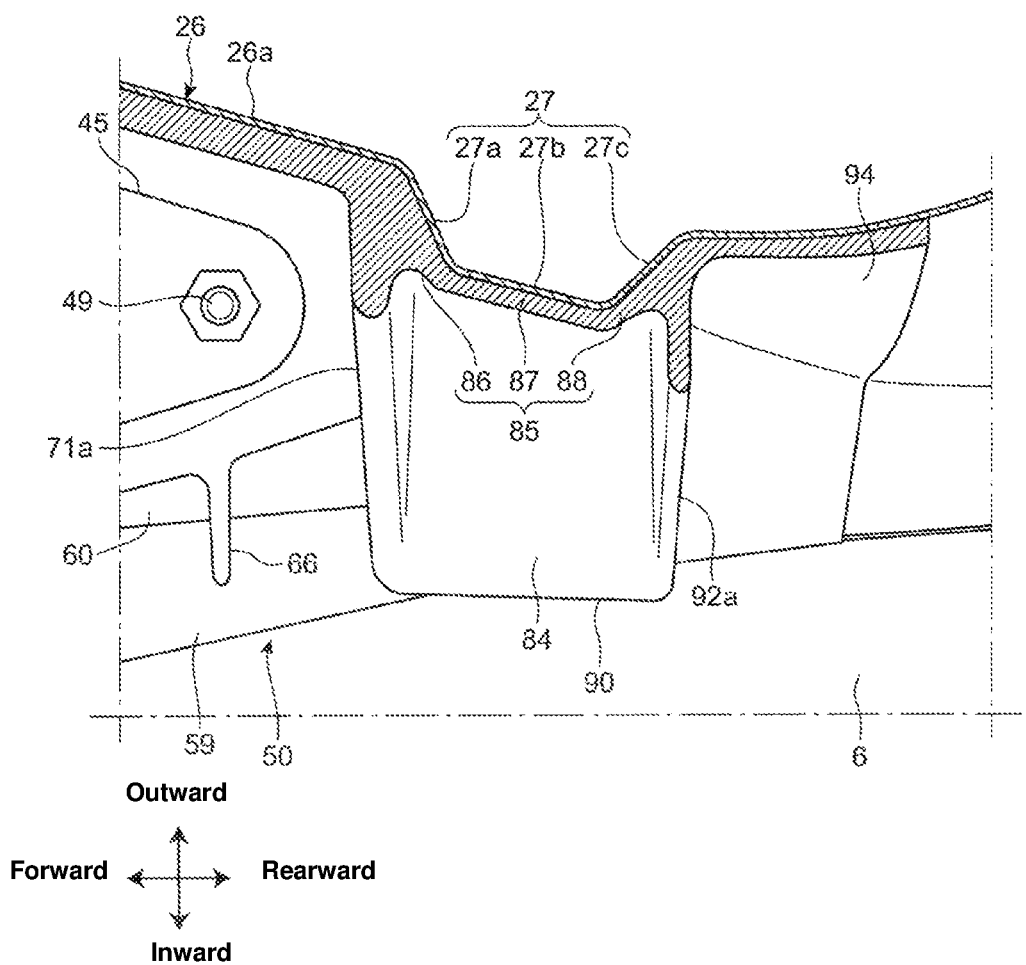
FIG. 15 is a sectional view taken along line G-G of the rear-side load transmission portion of the suspension housing and its surrounding portion shown in FIG. 1, when viewed from the upward side of the vehicle body.

As shown in the sectional view of FIG. 15, the load transmission portion 27 is configured to have a hat-shaped cross section opening to the cabin outside, for example. The load transmission portion 27 has the similar-shaped cross section over its substantially whole length. That is, the load transmission portion 27 has the open cross section continuously extending in the vehicle vertical direction.

The load transmission portion 27 comprises a front face portion 27*a*, a side face portion 27*b*, and a rear face portion 27*c*. The front face portion 27*a* extends outward in the vehicle width direction from a front edge portion of the side face portion 27*b*, and the rear face portion 27*c* extends outward in the vehicle width direction from a rear edge portion of the side face portion 27*b*.

The front face portion 27*a* is provided to slant forward and outward in the vehicle width direction, and the rear face portion 27*c* is provided to slant rearward and outward in the vehicle width direction. The side face portion 27*b* and the front face portion 27*a* form a corner portion having an obtuse angle between them, and the side face portion 27*b* and the rear face portion 27*c* form a corner portion having an obtuse angle. Thus, a sectional shape of the load transmission portion 27 is configured to expand toward the outward side in the vehicle width direction.

As shown in FIG. 1, an upper end portion of the load transmission portion 27 is provided to face a lower end portion of the outward-side reinforcing member 34, interposing the side panel 20 between them. Thus, since the load transmission portion 27 and the outward-side reinforcing member 34 are interconnected via the side panel 20, the effective load transmission from the wheel house inner 26 to the outward-side reinforcing member 34, is possibly attained.

[Side Brace]

A side brace 26 which connects the cross member 5 and the C pillar 12 is provided on the forward side of the recess portion 26*d* of the wheel house inner 26. The side brace 36 is provided to extend outward and upward along a cabin-inside face of the wheel house inner 26 from an end portion of the cross member 5 to a lower end portion of the C pillar 12.

The side brace 36 comprises an upper brace member 38 which is joined to the wheel house inner 26 by welding, for example, and a brace portion 77 which is formed integrally with the suspension housing 50, which will be described later, and connected to a lower end portion of the upper brace member 38.

The upper brace member 38 is a long member having a hat-shaped cross section opening to the cabin outside. The upper brace member 38 is a high-rigidity member which is made of a steel plate which is thicker than the wheel house inner 26, for example. A lower end portion of the upper brace member 38 is joined to the brace portion 77 by SPR (self-piercing rivet), for example, and an upper end portion of the upper brace member 38 is joined to the lower panel 22 of the side panel 20 by welding, for example.

An upper end portion of the upper brace member 38 is provided to face a lower end portion of the outer pillar member 32, interposing the side panel 20 between them. Thus, since the side brace 36 and the C pillar 12 are interconnected, the load transmission between the side brace 36 and the C pillar 12 can be attained effectively.

A lower side portion of the side brace 36 which is positioned below the upper brace member 38 is configured by the brace portion 77 of the suspension housing 50. The structure of the brace portion 77 will be described later as well as the structure of the suspension housing 50.

[Suspension]

As shown in FIG. 3, the suspension for the rear wheel 40 is supported by the suspension housing 50 which connects the side frame 6 and the wheel house inner 26.

The suspension 40 comprises, as major components, a coil spring 44 which is provided between the wheel and the vehicle body for absorbing an impact and a damper 41 which is provided between the wheel and the vehicle body to be expandable for absorbing vibration of the coil spring 44.

The damper 41 is provided adjacently to the outward side, in the vehicle width direction, of the side frame 6, extending in the vehicle vertical direction. The damper 41 comprises a piston rod 42 and a cylinder 43. The piston rod 42 slides in the cylinder 43, so that the damper 41 is expandable in its shaft-center direction. A shaft center of the damper 41 is configured to slant (offset) upward, in the vehicle vertical direction, and inward, in the vehicle width direction, relatively to the vehicle vertical direction.

A lower portion (not illustrated) of the cylinder 43 is connected to the wheel via a knuckle and others. A lower spring seat 47 is attached to a central portion, in a longitudinal direction, of the cylinder 43. The lower spring seat 47 is fixed to an outer peripheral face of the cylinder 43 by welding, for example.

The piston rod 42 is provided to protrude upward from the cylinder 43. An upper mount 45 is attached to an upper end portion of the piston rod 42 or the vicinity of the upper end portion of the piston rod 42. The upper mount 45 is fixed to a support face portion 52 (which will be described later) of the suspension housing 50. Thus, an upper end portion of the damper 41 is connected to the vehicle body via the upper mount 45 and the suspension housing 50.

A spring receiving portion 72 (which will be descried later) which serves as an upper spring seat is formed integrally with the suspension housing 50 at a position which is located on the downward side of the upper mount 45 and on the upward side of the lower spring seat 47. Since the spring receiving portion 72 is fixed to the piston rod 42 via the upper mount 45, and the lower spring seat 47 is fixed to the cylinder 43, the distance, in the shaft-center direction of the damper 41, between the spring receiving portion 72 and the lower spring seat 47 is changeable in accordance with the expansion of the damper 41.

The coil spring 44 is arranged around and substantially coaxially with the damper 41. Herein, it may be unnecessary that a load axis of the coil spring 44 matches the shaft center of the damper 41, and the load axis of the coil spring 44 may be provided to slant relatively to the shaft center of the damper 41.

The coil spring 44 is interposed between the spring receiving portion 72 of the suspension housing 50 and the lower spring seat 47. A seat rubber 46 is interposed between the coil spring 44 and the spring receiving portion 72, whereby impact or noise which may occur during bumping of the rear wheel can be absorbed or reduced.

Further, the suspension 40 includes a bump stopper 48 which is arranged on the shaft center of the damper 41. The bump stopper 48 is a tubal member which has different outer diameters in accordance with a position in its axial direction, for example, and made of rubber or urethane, for example. The bump stopper 48 is fitted around the piston rod 42 and arranged between the cylinder 43 and the support face portion 52 of the suspension housing 50 in the axial direction.

[Suspension Housing]

Figure 4:
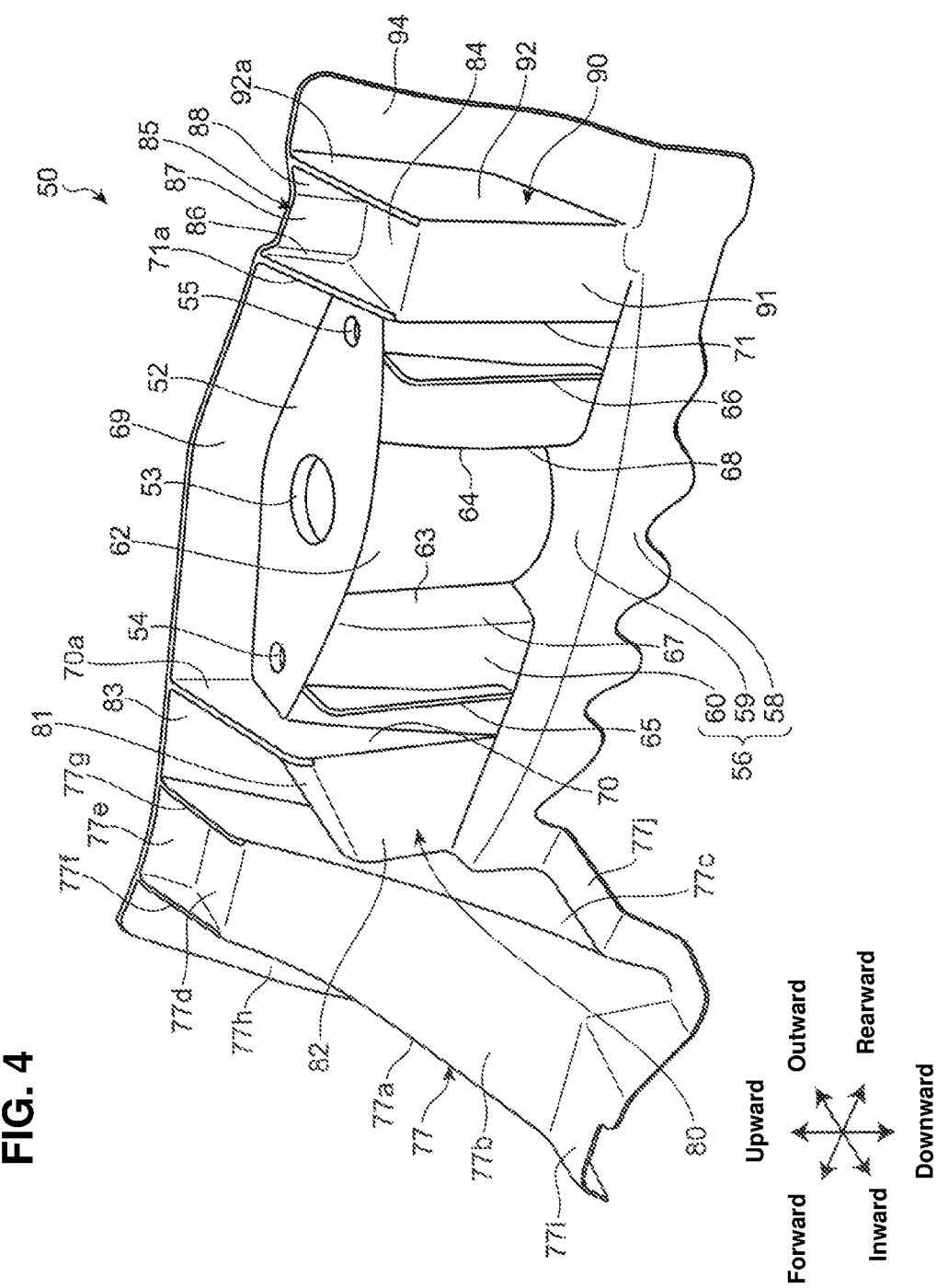
FIG. 4 is a perspective view of a suspension housing, when viewed from an obliquely-upward side inside the cabin.
Figure 5:
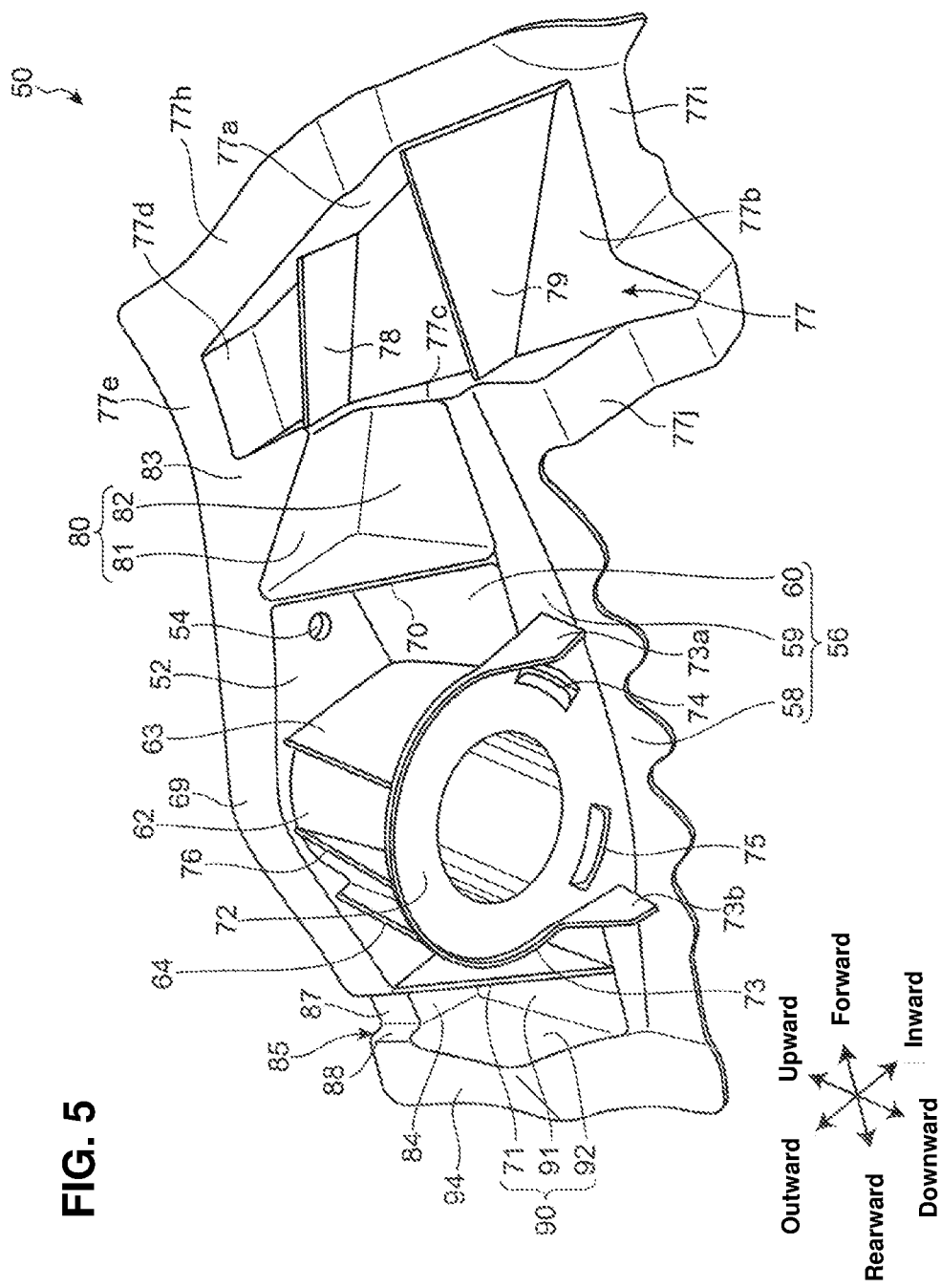
FIG. 5 is a perspective view of the suspension housing, when viewed from an obliquely-downward side outside the cabin.
Figure 6:
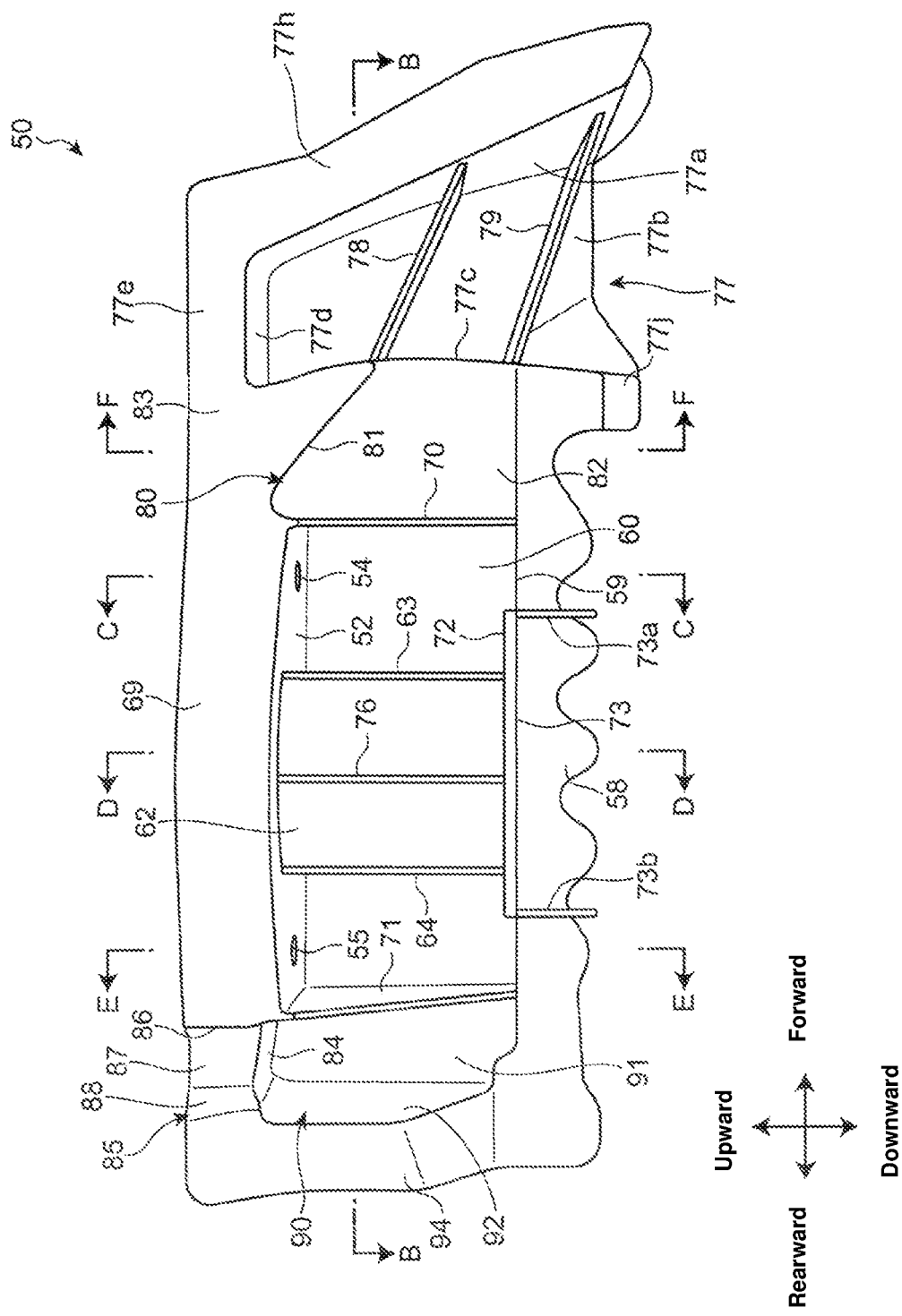
FIG. 6 is a side view of the suspension housing, when viewed from the outside of the cabin.

FIGS. 4-6 show a whole part of the suspension housing 50. The suspension housing 50 is an aluminum-alloy made member which is formed by die casting, for example.

[Support Face Portion]

The suspension housing 50 comprises the support face portion 52 for supporting the damper 41 of the suspension 40. The support face portion 52 is a plate-shaped member which is provided to cross the vehicle vertical direction. The support face portion 52 is of a slender shape such that a width, in the vehicle longitudinal direction, thereof is larger than a width, in the vehicle width direction, thereof. The width in the vehicle width direction, of the support face portion 52 is the largest at a center, in the vehicle longitudinal direction, thereof, and becomes gradually smaller toward its forward end portion and its rearward end portion, respectively.

A through hole 53 for insertion of the piston rod 42 of the damper 41 is formed at a central portion, in the vehicle longitudinal direction, of the support face portion 52. Further, the support face portion 52 has plural bolt insertion holes 54, 55. These holes 54, 55 are provided on a forward side of the through hole 53 and on a rearward side of the through hole 53, for example. The through hole 53 and a pair of front-and-rear bolt insertion holes 54, 55 are aligned such that they are spaced apart from each other in a length direction of the support face portion 52.

As shown in FIG. 3, the support face portion 52 is arranged perpendicularly to the shaft center of the damper 41 at a position which is located on the outward side, in the vehicle width direction, and the upward side, in the vehicle vertical direction, of the side frame 6. The upper mount 45 of the suspension 40 is attached to an upper face of the support face portion 52. The upper mount 45 is fixed to the support face portion 52 by bolts 49 (see FIGS. 13 and 14) which are inserted into the bolt insertion holes 54, 55, for example. Fastening portions by the bolts 49 are provided on the forward side and the rearward side, in the vehicle longitudinal direction, of the damper 41. The damper 41 is fixed to the support face portion 52 via the upper mount 45.

As shown in FIGS. 3-6, the suspension housing 50 comprises an upper joint face portion 69 which rises upward from an outward-side edge portion, in the vehicle width direction, of the support face portion 52 and is connected to the wheel house inner 26. The upper joint face portion 69 is joined to an upper-side peripheral edge portion of the cutout 26e of the wheel house inner 26 at plural joint portions R1, R2, R3 and R4 (see FIG. 11) which are spaced apart from each other in the vehicle longitudinal direction by the SPR, for example.

[Connection Portion]

The suspension housing 50 comprises a connection portion 56 which connects the support face portion 52 to the side frame 6. The connection portion 56 comprises a lower joint face portion 58 which is provided to cross the vehicle width direction and connected to the side frame 6, a middle-level floor portion 59 which extends outward from an upper edge portion of the lower joint face portion 58, and a vertical wall portion 60 which extends upward from an outward-side edge portion, in the vehicle width direction, of the middle-level floor portion 59 up to an inward-side edge portion, in the vehicle width direction, of the support face portion 52.

FIGS. 9A, 9B and 9C are sectional views taken along line C-C, D-D, and E-E of the suspension housing 50 shown in FIG. 6, when viewed from the forward side of the vehicle body. As shown in FIGS. 9A, 9B and 9C, a shape of the cross section of the suspension housing 50, when viewed from the vehicle longitudinal direction, is configured such that an area from the lower joint face portion 58 to the upper joint face portion 69 by way of the middle-level floor portion 59, the vertical wall portion 60, and the support face portion 52 has a stepwise where the height becomes greater toward the outward side, in the vehicle width direction, of the vehicle body.

As shown in FIGS. 4-6, the lower joint face portion 58 is formed in a belt shape which extends in the vehicle longitudinal direction. A lower edge of the lower joint face portion 58 is provided to extend in the vehicle longitudinal direction, meandering in a wave shape. The lower joint face portion 58 is provided to overlap a cabin-inside face of the outward-side wall portion 8d of the side frame 6 (see FIG. 3), and joined to the side frame 6 at plural points which are spaced apart from each other in the length direction by the SPR, for example.

The lower joint face portion 58 is configured to be longer than the support face portion 52 in the vehicle longitudinal direction. A front end of the lower joint face portion 58 is positioned on the forward side of a front end of the support face portion 52, and a rear end of the lower joint face portion 58 is positioned on the rearward side of a rear end of the support face portion 52.

The middle-level floor portion 59 is configured to extend long in the vehicle longitudinal direction. An inward-side edge portion, in the vehicle width direction, of the middle-level floor portion 59 is configured in an arc shape such that it protrudes slightly toward the inward side, in the vehicle width direction, of the vehicle body, when viewed from the vehicle vertical direction.

As shown in FIG. 3, the middle-level floor portion 59 is provided to slant outward and slightly upward. A corner having an obtuse angle is formed between the middle-level floor portion 59 and the lower joint face portion 58.

As shown in FIG. 4, a central portion, in the vehicle longitudinal direction, of the vertical wall portion 60 is configured by an inward-side end portion, in the vehicle width direction, of a peripheral wall portion 62 which extends downward from the support face portion 52, and portions of the vertical wall portion 60 which are positioned on the forward side and the rearward side of the peripheral wall portion 62 are configured to be of a flat-plate shape.

[Peripheral Wall Portion]

As shown in FIGS. 4-7, the peripheral wall portion 62 is of a cylindrical shape which extends in the vehicle vertical direction. As shown in FIG. 8, an inner peripheral face of the peripheral wall portion 62 has a larger diameter than the through hole 53 of the support face portion 52, and is provided coaxially with the through hole 53, when viewed from the axial direction.

As shown in FIG. 3, the peripheral wall portion 62 is provided to enclose the bump stopper 48 of the suspension 40 which is positioned below the support face portion 52.

Thus, since the bump stopper 48 is housed by the peripheral wall portion 62, the bump stopper 48 can be protected from foreign substances or water.

As shown in FIGS. 4-7, the suspension housing 50 comprises a front wall portion 63 positioned on the forward side of the peripheral wall portion 62 and a rear wall portion 64 positioned on the rearward side of the peripheral wall portion 62. The front wall portion 63 and the rear wall portion 64 are respectively a flat-plate shaped wall portion which is provided to cross the vehicle longitudinal direction, which are respectively provided to extend downward from the support face portion 52.

Figure 7:
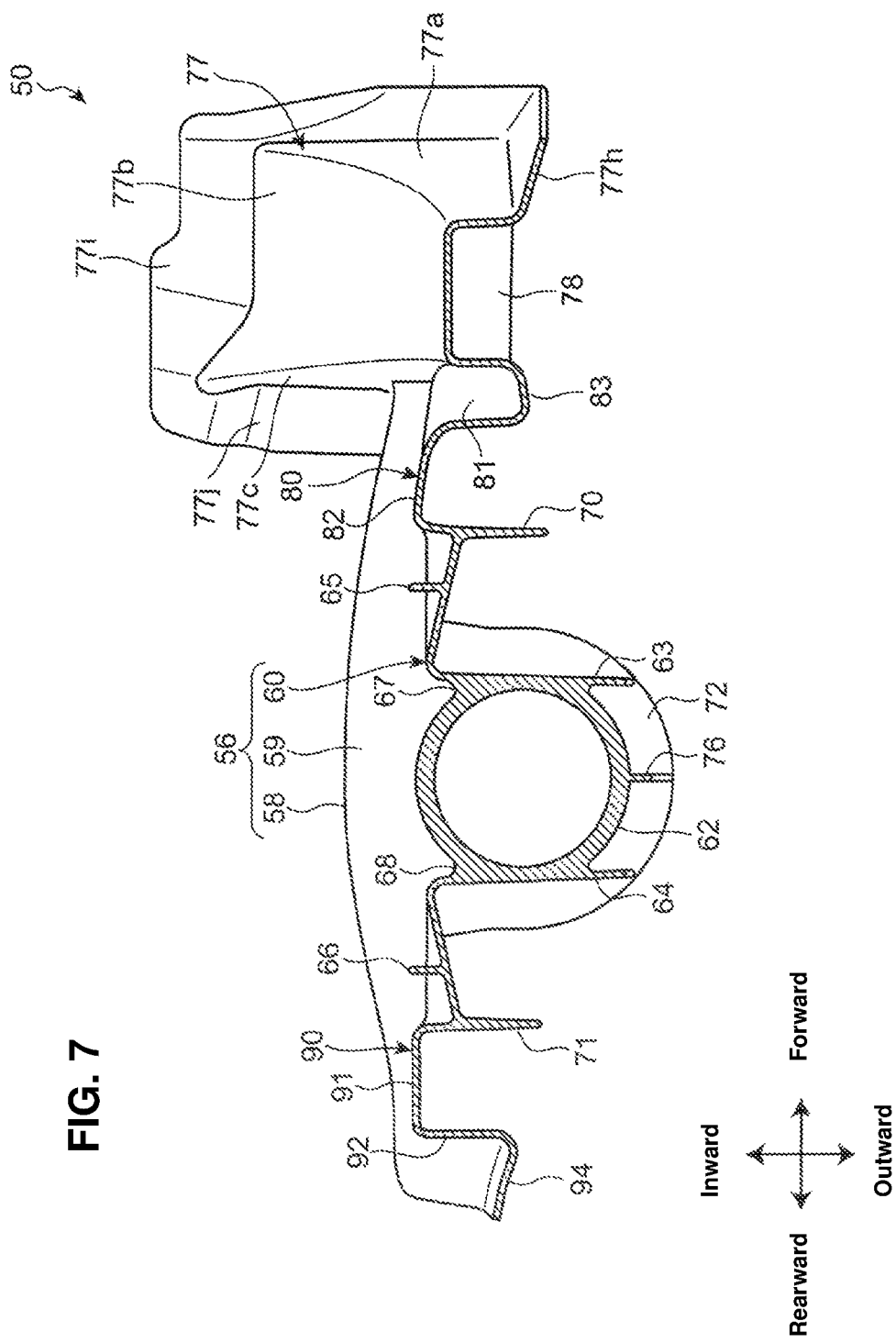
FIG. 7 is a sectional view taken along line B-B of the suspension housing shown in FIG. 6, when viewed from an upward side of the vehicle body.
Figure 8:
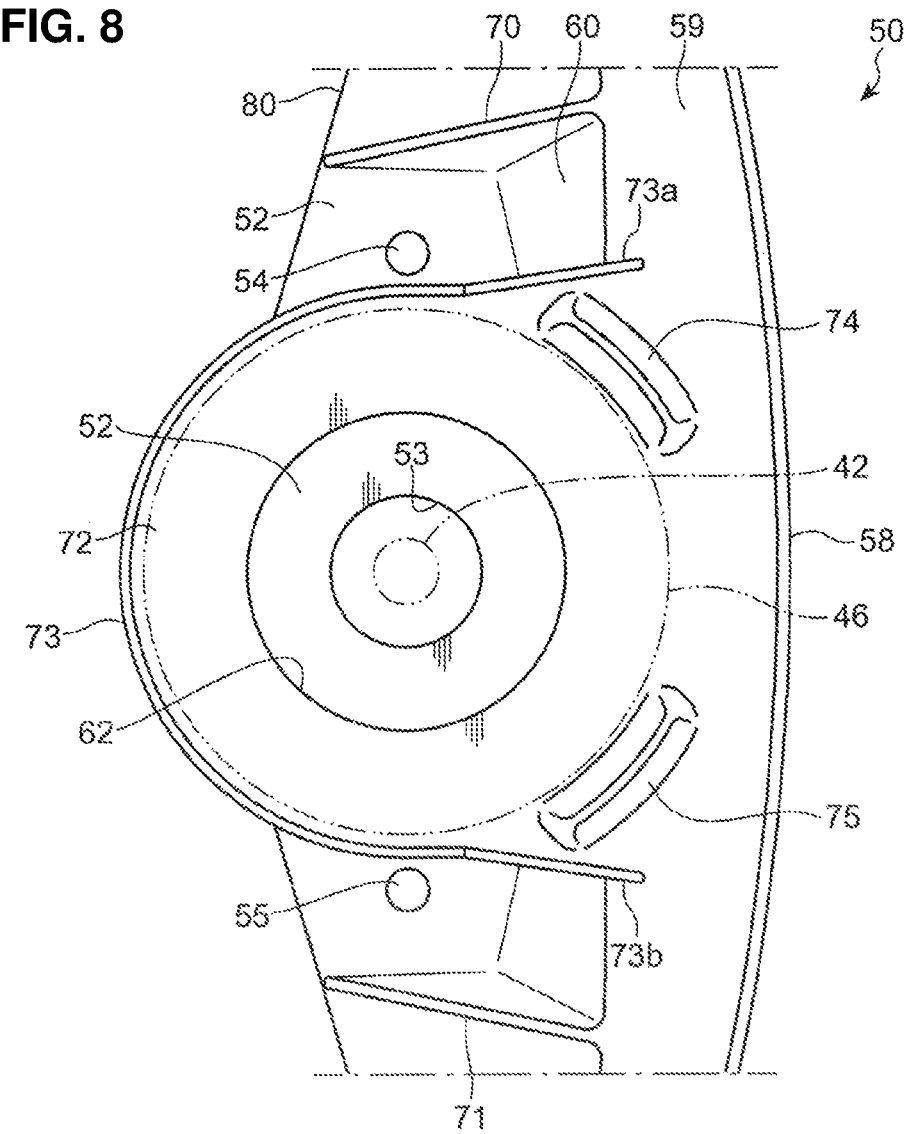
FIG. 8 is a bottom view of a portion of the suspension housing, when viewed from a downward side of the vehicle body.

As shown in FIG. 7, the front wall portion 63 is arranged along a tangential direction at a front end of the peripheral wall portion 62, when viewed from the axial direction of the peripheral wall portion 62, and the rear wall portion 64 is arranged along a tangential direction at a rear end of the peripheral wall portion 62, when viewed from the axial direction of the peripheral wall portion 62.

[Spring Receiving Part]

As shown in FIG. 5, the above-described spring receiving portion 72 is provided to protrude outward from the middle-level floor portion 59 at the suspension housing 50. The spring receiving portion 72 is provided at a lower end portion of the peripheral wall portion 62. More specifically, the spring receiving portion 72 is provided to expand radically outside from a lower edge of the peripheral wall portion 62 in a flange shape. Thus, a through hole which is configured by an inner peripheral face of the peripheral wall portion 62 is formed at a central portion of the spring receiving part, where the piston rod 42 of the damper 41 is inserted (see FIG. 3).

As shown in FIG. 3, the spring receiving portion 72 is arranged on the outward side and the upward side of the side frame 6, and supports an upper end portion of the coil spring 44 of the suspension 40 via the seat rubber 46, for example. Thus, the suspension housing 50 of the present embodiment is configured to support not only the damper 41 by the support face portion 52 but the coil spring 44 by using the spring receiving portion 72 which is provided at the middle-level floor portion 59.

Further, since the spring receiving portion 72 which is provided at the lower end portion of the peripheral wall portion 62 is continuous to the middle-level floor portion 59, the peripheral wall portion 62 is connected to the middle-level floor portion 59 via the spring receiving portion 72 on its lower-end side. Moreover, since the upper-end side of the peripheral wall portion 62 is connected to the support face portion 52, the support face portion 52 and the middle-level floor portion 59 are interconnected via the peripheral wall portion 62. Thereby, deformation of the stepwise cross section which is formed by the lower joint face portion 58, the middle-level floor portion 59, the vertical wall portion 60, and the support face portion 52 is effectively suppressed.

As shown in FIGS. 5 and 8, a lower face of the spring receiving portion 72 is substantially of a circular shape. That is, a portion of the spring receiving portion 72 which receives a load from the coil spring 44 is configured by a ring portion which extends from an outer peripheral portion of the above-described through hole to an outer peripheral portion of the spring receiving portion 72, so that an area of the spring receiving portion 72 is made as small as possible.

Protrusion portions 73, 74, 75 which protrude downward from the spring receiving portion 72 are provided at a peripheral edge portion of the spring receiving portion 72. The protrusion portions 73, 74, 75 are provided to be spaced apart from each other in a circumferential direction of the spring receiving portion 72.

These plural protrusion portions 73, 74, 75 comprise, for example, the first protrusion portion 73 which extends continuously along a peripheral edge of the outward (half) side, in the vehicle width direction, of the spring receiving portion 72 and is of a semicircular shape in the plan view, the second protrusion portion 74 which extends in an arc shape, in the plan view, along a peripheral edge of a portion of the spring receiving portion 72 which is positioned on the inward side and the forward side of the center of the spring receiving portion 72, and the third protrusion portion 75 which extends in an arc shape, in the plan view, along a peripheral edge of a portion of the spring receiving portion 72 which is positioned on the inward side and the rearward side of the center of the spring receiving portion 72. The first, second, and third protrusion portions 73, 74, 75 are provided to be spaced apart from each other in the circumferential direction.

Thus, the protrusion portions 73, 74, 75 provided at the peripheral edge portion of the spring receiving portion 72 have the positioning function for positioning the seat rubber 46 and the upper end portion of the coil spring 44 in a radical direction, and also serve as a high-rigidity portion to increase the surface rigidity of the spring receiving portion 72. Therefore, the support strength of the coil spring 44 by the spring receiving portion 72 is increased.

Herein, while the high-rigidity portions comprising the above-described protrusion portions 73, 74, 75 are provided to extend discontinuously along the peripheral edge portion of the spring receiving portion 72 in the above-described embodiment, the high-rigidity member may be provided continuously along a whole periphery of the peripheral edge portion of the spring receiving portion 72.

[Connection of Spring Receiving Portion and Side Frame]

Further, the suspension housing 50 comprises connected portions 73a, 73b which are provided to protrude downward from the spring receiving portion 72 for making the spring receiving portion 72 be connected to the side frame 6.

The connected portions 73a, 73b are provided to be spaced apart from each other in the vehicle longitudinal direction. The connected portions 73a, 73b are a rib-shaped portion which crosses the vehicle longitudinal direction and provided to be continuous to a circumferential-direction end portion of the first projection portion 73, respectively. The connected portions 73a, 73b protrude downward beyond a lower end of the first protrusion portion 73. The front-side connected portion 73a is arranged adjacently to the forward side of the second protrusion portion 74, and the rear-side connected portion 73b is arranged adjacently to the rearward side of the third protrusion portion 75.

As shown in FIG. 12, the spring receiving portion 72 is connected to the side frame 6 via the connected portions 73a, 73b and connecting members 101, 102 which are provided below the spring receiving portion 72.

The connecting members 101, 102 are provided to be spaced apart from each other in the vehicle longitudinal direction. These members 101, 102 are made of a metal plate, such as the steel plate, by the press forming, for example.

Each of the connecting members 101, 102 comprises a first connection face portion 103 which is provided to cross the vehicle longitudinal direction and connected to the spring receiving portion 72, a second connection face portion 104 which is provided to cross the vehicle width direction and connected to the outward side, in the vehicle width direction, of the side frame 6, and a third connection face portion 105 which is provided to cross the vehicle vertical direction and connected to the downward side of the side frame 6.

The second connection face portion 104 is joined to an outward-side face, in the vehicle width direction, of the side frame 6 by welding, for example. The third connection face portion 105 is provided to extend inward from a lower edge portion of the second connection face portion 104, and joined to the lower-side face of the side frame 6 by welding, for example.

The first connection face portion 103 is provided to extend outward from a front edge portion of the second connection face portion 104 at the front-side connecting member 101. The second connection face portion 103 is of a triangular taper shape, when viewed from the vehicle longitudinal direction, for example. An upper end portion of the first connection face portion 103 is joined to a rear-side face of the front-side connected portion 73*a* of the suspension housing 50 by the SPR, for example.

Each of the connecting members 101, 102 further comprises a flange portion 106 which is continuous to an outward-side edge portion, in the vehicle width direction, of the first connection face portion 103. The flange portion 106 of the front-side connecting member 101 is provided to extend forward from the first connection face portion 103, and the flange portion 106 of the rear-side connecting member 102 is provided to extend rearward from the first connection face portion 103. A lower end portion of each of the flange portions 106 is continuous to the third connection face portion 105.

Herein, the front and rear connecting members 101, 102 may be provided such that the both second connection face portions 104 are continuous to each other or the both third connection face portions 105 are continuous to each other.

Since the spring receiving portion 72 is connected to the side frame 6 via the connected portions 73*a*, 73*b* and the connecting members 101, 102 as described above, respective moves of the spring receiving portion 72 and the side frame 6 when the load is inputted from the coil spring 44 (see FIG. 3) of the suspension 40 are integrated.

[High-Rigidity Portion of Vertical Wall Portion]

As shown in FIGS. 4 and 7, the vertical wall portion 60 comprises a front-side groove-shaped recess (depression) portion 67 which extends in the vehicle vertical direction along a front end portion of the peripheral wall portion 62 and a rear-side groove-shaped recess (depression) portion 68 which extends in the vehicle vertical direction along a rear end portion of the peripheral wall portion 62. The front-side recess portion 67 and the rear-side recess portion 68 are respectively provided over a whole height of the vertical wall portion 60.

Further, at the vertical wall portion 60 are provided a front-side rib 65 which protrudes inward from a portion of the vertical wall portion 60 which is positioned on the forward side of the front-side recess portion 67 and a rear-side rib 66 which protrudes inward from a portion of the vertical wall portion 60 which is positioned on the rearward side of the rear-side recess portion 68. The front-side rib 65 and the rear-side rib 66 are provided to extend in the vehicle vertical direction, respectively. Further, the front-side rib 65 and the rear-side rib 66 are respectively provided over the whole height of the vertical wall portion 60.

The above-described recess portions 67, 68 and ribs 65, 66 are respectively a high-rigidity portion which is provided to extend in the vehicle vertical direction at the vertical wall portion 60, and the surface rigidity of the vertical wall portion 60 is increased by these high-rigidity portions.

As shown in FIG. 4, a longitudinal position, in the vehicle longitudinal direction, of the front-side rib 65 at the vertical wall portion 60 overlaps a longitudinal position, in the vehicle longitudinal direction, of the front-side bolt insertion hole 54 at the support face portion 52 when viewed from the vehicle width direction. Further, a longitudinal position, in the vehicle longitudinal direction, of the rear-side rib 66 at the vertical wall portion 60 overlaps a longitudinal position, in the vehicle longitudinal direction, of the rear-side bolt insertion hole 55 at the support face portion 52 in the vehicle longitudinal direction.

As described above, the longitudinal positons of the ribs 65, 66 at the vertical wall portion 60 overlap the longitudinal positions of the fastening portions (see FIGS. 13 and 14) of the upper mount 45 by using the bolts 49 when viewed from the vehicle width direction. Accordingly, the fastening portions where the load is inputted from the damper 41 at the support face portion 52 and their surrounding portions can be effectively supported by the portions of the vertical wall portion 60 where the ribs 65, 66 are provided.

[Brace Portion and Front-Side Load Transmission Portion]

The brace portion 77 which constitutes a portion of the side brace 36 (see FIG. 1) and a front-side load transmission portion 80 which transmits a load from the support face portion 52 to the brace portion 77 are provided at a portion of the suspension housing 50 which is positioned on the forward side of the support face portion 52.

The brace portion 77 is provided to extend in the vehicle vertical direction on the forward side of the support face portion 52. The brace portion 77 is configured to have an open cross section which opens to the cabin outside. An opening portion of the brace portion 77 is closed with the wheel house inner 26 from the cabin outside (see FIG. 11), so that a closed cross section extending continuously in the vehicle vertical direction is formed between the brace portion 77 and the wheel house inner 26. An inward-side side face, in the vehicle width direction, of the brace portion 77 is provided to slant upward and outward.

As shown in FIGS. 4-6, the brace portion 77 comprises a front face portion 77*a* which is provided to cross the vehicle longitudinal direction, a side face portion 77*b* which extends rearward from an inward-side edge portion, in the vehicle width direction, of the front face portion 77*a*, and a rear face portion 77*c* which extends outward in the vehicle width direction from an rear-side edge portion of the side face portion 77*b* and is provided to face a rearward side of the front face portion 77*a*.

Reinforcing ribs 78, 79 are provided inside the brace portion 77, thereby suppressing deformation of a cross section of the brace portion 77. The reinforcing ribs 78, 79 are an upper-side reinforcing rib 78 and a lower-side reinforcing rib 79 which are provided to be spaced apart from each other in the vehicle vertical direction.

The respective reinforcing ribs 78, 79 are connected to the front face portion 77*a* at their front-side edge portions, connected to the side face portion 77*b* at their inward-side edge portions, and connected to the rear face portion 77*c* at their rear-side edge portions. Thus, an inside space of the brace portion 77 is partitioned in the vehicle vertical direction by the reinforcing ribs 78, 79.

As shown in FIG. 6, the upper-side reinforcing rib 78 and the lower-side reinforcing rib 79 are provided to slant forward and downward. The upper-side reinforcing rib 78 and the lower-side reinforcing rib 79 are provided substantially in parallel to each other, when viewed from the vehicle width direction.

Further, as shown in FIGS. 4 and 5, the brace portion 77 comprises an upper face portion 77*d* which extends outward from an upper-side edge portion of the side face portion 77*b*, an upper-side flange portion 77*e* which extends upward from an outward-side edge portion of the upper face portion 77*d*, a front-side rib 77*f* which extends over a front-side edge portion of the upper face portion 77*d* and a front-side edge portion of the upper-side flange portion 77*e*, and a rear-side rib 77*g* which extends over a rear-side edge portion of the upper face portion 77*d* and a rear-side edge portion of the upper-side flange portion 77*e*. The front-side rib 77*f* is configured by an upper end portion of the front face portion 77*a*, and the rear-side rib 77*g* is configured by an upper end portion of the rear face portion 77*c*.

Further, the brace portion 77 comprises a front-side joint face portion 77*h* which extends forward from an inward-side edge portion, in the vehicle width direction, of the front face portion 77*a*, an inward-side joint face portion 77*i* which extends inward from a lower edge portion of the side face portion 77*b*, and a rear-side joint face portion 77*j* which extends rearward from a lower edge portion of the rear face portion 77*c*.

The front-side joint face portion 77*h* is joined to the wheel house inner 26 at plural joint portions R10, R11, R13 (see FIG. 11) which are spaced apart from each other in the vehicle vertical direction by the SPR, for example. Further, the inward-side joint face portion 77*i* is joined to the cross member 5 and the rear-side joint face portion 77*j* is joined to the side frame 6, respectively, by the SPR, for example (see FIG. 1).

As shown in FIG. 1, a lower end portion of the upper-side brace member 38 is provided to overlap an upper end portion of the brace portion 77 from the cabin inside such that the upper face portion 77*d*, the front-side rib 77*f* and the rear-side rib 77*g* are covered with it, and joined by the SPR, for example. Thus, the upper end portion of the brace portion 77 is connected to the lower end portion of the lower end portion of the upper-side brace member 38, so that the side frame 36 which is configured by the upper-side brace member 38 and the brace portion 77 is formed.

The lower end portion of the brace portion 77 is joined to the cross member 5 at the inward-side joint face portion 77*i*, and connected to the outward-side end portion, in the vehicle width direction, of the cross member 5. Thus, the load transmission between the side brace 36 and the cross member 5 is possibly attained.

As shown in FIGS. 4 and 5, a partitioning wall portion 70 which is arranged along a face crossing the vehicle longitudinal direction is provided between the support face portion 52 and the front-side load transmission portion 80 at the suspension housing 50.

An extension face portion 83 which is formed by extending the upper-side joint face portion 69 forward is provided on the forward side of the partitioning wall portion 70. The extension face portion 83 is joined to the wheel house inner 26 at a joint portion R8 (see FIG. 11) of a front-side peripheral edge of the cutout 26*e* by the SPR, for example.

The partitioning wall portion 70 is provided such that a front edge portion of the upper-side joint face portion 69, a front edge portion of the support face portion 52, and a front edge portion of the vertical wall portion 60 are interconnected. The partitioning wall portion 70 is provided to protrude inward and upward beyond the front edge portion of the support face portion 52, and a portion of the partitioning wall portion 70 which protrudes upward beyond the support face portion 52 configures a triangular taper rib 70*a*, for example (see FIG. 4).

A portion of the partitioning wall portion 70 which is positioned on the downward side of the support face portion 52 is configured to be of a triangular taper shape, when viewed from the vehicle longitudinal direction, for example (see FIG. 5). A lower end portion of the partitioning wall portion 70 is continuous to an outward-side edge portion, in the vehicle width direction, of the middle-level floor portion 59.

The front-side load transmission portion 80 includes a connection face portion 81 which makes the front edge portion of the support face portion 52 be connected to the rear face portion 77*c* of the brace portion 77. The connection face portion 81 is arranged along a face crossing the vehicle vertical direction, and provided to extend forward from the partitioning wall portion 70. The connection face portion 81 is provided to slant forward and downward, when viewed from the vehicle width direction (see FIG. 6).

An outward-side edge portion, in the vehicle width direction, of the connection face portion 81 is continuous to a lower edge portion of the extension face portion 83 via a corner portion. That is, the connection face portion 81 is provided to extend inward from a lower edge portion of the extension face portion 83.

A rear edge portion of the connection face portion 81 is provided substantially at the same level as the support face portion 52 in the vehicle vertical direction. That is, the rear edge portion of the connection face portion 81 is connected to the front edge portion of the support face portion 52 via the partitioning wall portion 70. The above-described rib 70*a* is provided to extend over a boundary portion of the upper-side joint face portion 69 and the extension face portion 83 and the rear edge portion of the connection face portion 81. A lower end portion of the rib 70*a* is provided over a roughly whole width of the rear edge portion of the connection face portion 81 in the vehicle width direction (see FIG. 13).

The support face portion 52 and the connection face portion 81 are effectively supported by the wheel house inner 26 via the above-described rib 70*a*, the upper-side joint face portion 69, and the extension face portion 83, and the surface rigidity of the support face portion 52 and the connection face portion 81 is increased by the rib 70*a*. Further, when the load is inputted to the support face portion 52 from the damper 41 of the suspension 40, the load transmitted from the support face portion 52 to the rib 70*a* directly or via the upper-side joint face portion 69 is dispersed and inputted from the lower end portion of the rib 70*a* to the rear end portion of the connection face portion 81 over its whole width.

Further, the front-side load transmission portion 80 comprises a side face portion 82 which extends downward from an inward-side edge portion, in the vehicle width direction, of the connection face portion 81. The side face portion 82 is provided to extend forward from an inward-side edge portion, in the vehicle width direction, of the partitioning wall portion 70. A lower edge portion of the side face portion 82 is continuous to the outward-side edge portion of the middle-level floor portion 59 via a corner portion. A width, in the vehicle vertical direction, of the side face portion 82 is configured to become gradually smaller toward the forward side of the vehicle body.

As shown in FIG. 10, the front-side load transmission portion 80 is configured to have an L-shaped open cross section which is formed by the connection face portion 81 and the side face portion 82. That is, the front-side load transmission portion 80 is configured to have the open cross section extending in the vehicle longitudinal direction.

Herein, a cross section portion formed at the front-side load transmission portion 80 is not limited to the open cross section, but a closed cross section may be formed between the suspension housing 50 and another member, such as the wheel house inner 26 at a portion or a whole part of the front-side load transmission portion 80. Such a closed cross section may be configured by the suspension housing 50 itself.

The suspension housing 50 is not joined to the wheel house inner 26 at the front-side load transmission portion 80, but joined to the wheel house inner 26 at the above-described joint portion R8 which is adjacent to an upper side of the front-side load transmission portion 80 and also joined to the wheel house inner 26 at a joint portion R9 which is adjacent to a lower side of the front-side load transmission portion 80 by the SPR, for example. The joint portion R9 is provided at the lower-side joint face portion 58 in an area which is occupied by the side face portion 82 in the vehicle longitudinal direction.

As described above, the front-side load transmission portion 80 is provided between the support face portion 52 and the brace portion 77 which is provided to be spaced forward apart from the support face portion 52 at the suspension housing 50. Thus, when the load is inputted to the support face portion 52 from the damper 41 of the suspension 40, the load transmission from the support face portion 52 to the brace portion 77 can be effectively attained by way of the front-side load transmission portion 80.

Further, since this load transmission is attained by way of the connection face portion 81 which slants forward and downward, the load including a downward directional component can be made to be inputted to the brace portion 77. Accordingly, the load transmission directed toward the lower end from the upper end of the brace portion 77 is easily attained, so that the load transmission from the brace portion 77 to the cross member 5 positioned on the lower-end side of the brace portion 77 can be conducted smoothly, which can increase a load-dispersion effect to respective portions of the vehicle body.

As shown in FIG. 6, the connection face portion 81 of the front-side load transmission portion 80 is provided to extend from the front end portion of the support face portion 52 toward the upper-side reinforcing rib 78 provided inside the brace portion 77. Further, a rear end portion of the upper-side reinforcing rib 78 is provided substantially at the same level, in the vehicle vertical direction, as a front end portion of the connection face portion 81 of the front-side load transmission portion 80.

By this positional relation of the connection face portion 81 and the upper-side reinforcing rib 78, a load input portion of the brace portion 77 from the connection face portion 81 is effectively reinforced by the upper-side reinforcing rib 78. Further, since the upper-side reinforcing rib 78 is provided to slant forward and downward, the load transmission from the upper end to the lower end of the upper-side reinforcing rib 78 can be attained. Accordingly, the load inputted to the brace portion 77 from the front-side load transmission portion 80 can be transmitted to the lower-end side of the brace portion 77.

Further, a rear end portion of the lower-side reinforcing rib 79 provided inside the brace portion 77 is provided substantially at the same level, in the vehicle vertical direction, as a front lower end portion of the side face portion 82 of the front-side load transmission portion 80. Accordingly, the load input from the lower end portion of the front-side load transmission portion 80 is effectively reinforced by the lower-side reinforcing rib 79 at the brace portion 77. Moreover, the lower-side reinforcing rib 79 which is provided to slant forward and downward can attain the load transmission in a direction from the upper end to the lower end of the lower-side reinforcing rib 79. Accordingly, the load transmission from the front-side load transmission portion 80 to the cross member 5 by way of the brace portion 77 can be conducted more effectively.

[Rear-Side Load Transmission Portion]

As shown in FIGS. 4-6, a rear-side load transmission portion 85 which transmits the loads inputted to the support face portion 52 from the suspension 40 to the load transmission portion 27 of the wheel house inner 26 is provided at a portion of the suspension housing 50 which is positioned on a rearward side of the support face portion 52.

A partitioning wall portion 71 which is arranged along a face crossing the vehicle longitudinal direction is provided between the rear-side load transmission portion 85 and the support face portion 52 at the suspension housing 50.

The partitioning wall portion 71 is provided to interconnect a rear edge portion of the upper-side joint face portion 69, a rear edge portion of the support face portion 52, and a rear edge portion of the vertical wall portion 60. The partitioning wall portion 71 is provided to protrude inward and also upward beyond the rear edge portion of the support face portion 52.

A portion of the partitioning wall portion 71 which is positioned on the downward side of the support face portion 52 is of a triangular taper shape, when viewed from the vehicle longitudinal direction, for example (see FIG. 5). A lower end portion of the partitioning wall portion 71 is continuous to an outward-side edge portion, in the vehicle width direction, of the middle-level floor portion 59.

A connection face portion 84 which connects the support face portion 52 to the rear-side load transmission portion 85 is provided on the rearward side of the support face portion 52 at the suspension housing 50. The connection face portion 84 is provided to cross the vehicle vertical direction such that it extends rearward from the partitioning wall portion 71. The connection face portion 84 is positioned substantially at the same level as or the level downward adjacent to the support face portion 52 in the vehicle vertical direction. Thus, the connection face portion 84 is continuous to a rearward side of the support face portion 52 via the partitioning wall portion 71.

At a portion of the suspension housing 50 which is positioned on the rearward side of the connection face portion 84 are provided a rear wall portion 92 which faces a rearward side of the partitioning wall portion 71 and a rear-side joint face portion 94 which extends rearward from an outward-side portion, in the vehicle width direction, of the rear wall portion 92. The connection portion 84 is provided to extend between the partitioning wall portion 71 and the rear wall portion 92. The rear-side joint face portion 94 is joined to the wheel house inner 26 at plural joint portions R5, R6, R7 (see FIG. 11) which are spaced apart from each other in the vehicle vertical direction by the SPR, for example.

Further, the suspension housing 50 comprises a side wall portion 91 which extends downward from an inward-side edge portion, in the vehicle width direction, of the connection face portion 84. The side wall portion 91 is provided to extend between an inward-side edge portion, in the vehicle width direction, of the partitioning wall portion 71 and an inward-side edge portion of the rear wall portion 92. A lower end portion of the side wall portion 91 is continuous to the outward-side edge portion, in the vehicle width direction, of the middle-level floor portion 59.

Respective portions of the partitioning wall portion 71 and the rear wall portion 92 which are positioned on the downward side of the connection face portion 84 and the side wall portion 91 have a lower-side extension portion 90 which extends downward from the connection face portion 84. The lower-side extension portion 90 has a U-shaped cross section which opens outward (see FIG. 7). That is, the lower-side extension portion 90 has an open cross section which extends continuously in the vehicle vertical direction.

Herein, the cross section of the lower-side extension portion 90 is not limited to the open cross section, and a closed cross section may be formed between the suspension housing 50 and another member, such as the wheel house inner 26, at a portion of a whole part of the lower-side extension portion 90. Such a closed cross section may be configured by the suspension housing 50 itself.

As shown in FIG. 4, a front-side rib 71a and a rear-side rib 92a which are provided to face each other in the vehicle longitudinal direction with a gap between them are provided at an upper side of the lower-side extension portion 90. The ribs 71a, 92a are respectively of a triangular taper shape, for example.

The front-side rib 71a is configured by a portion of the partitioning wall portion 71 which protrudes upward beyond the connection face portion 84, and provided over a rear edge portion of the upper-side joint face portion 69 and a front edge portion of the connection face portion 84. The lower end portion of the upper-side rib 71a is provided over a roughly whole width of the front edge portion of the connection face portion 84 in the vehicle width direction.

The rear-side rib 92a is configured by a portion of the rear wall portion 921 which protrudes upward beyond the connection face portion 84, and provided over a front edge portion of the rear-side joint face portion 94 and a rear edge portion of the connection face portion 84. The rear-side rib 92a is provided over a roughly whole width of the rear edge portion of the connection face portion 84 in the vehicle width direction.

The rear-side load transmission portion 85 is provided to extend upward from an outward-side edge portion, in the vehicle width direction, of the connection face portion 84. The rear-side load transmission portion 85 comprises a front face portion 86 which extends inward from the rear edge portion of the upper-side joint face portion 69, a side face portion 87 which extends rearward from an inward-side edge portion, in the vehicle width direction, of the front face portion 86, and a rear face portion 88 which extends outward from a rear edge portion of the side face portion 87. An outward-side edge portion, in the vehicle width direction, of the rear face portion 88 is continuous to the front edge portion of the rear-side joint face portion 94.

The front face portion 86 is provided to slant outward and forward. The rear face portion 88 is provided to slant outward and rearward. A corner portion having an obtuse angle is formed respectively between the side face portion 87 and the front face portion 86 and between the side face portion 87 and the rear face portion 88. Thus, a sectional portion of the rear-side load transmission portion 85 is of a hat shape which expands outward. Accordingly, the rear-side load transmission portion 85 has an open cross section which opens outward and extends continuously in the vehicle vertical direction.

Herein, the sectional portion of the rear-side load transmission portion 85 is not limited to the open cross section, but a closed cross section may be formed between the suspension housing 50 and another member, such as the wheel house inner 26, at a portion or a whole part of the rear-side load transmission portion 85. Such a closed cross section may be configured by the suspension housing 50 itself.

As shown in FIGS. 13 and 14, the rear-side load transmission portion 85 is provided to overlap a cabin-inside face of a lower end portion of the load transmission portion 27 of the wheel house inner 26. As shown in FIG. 15, a shape of a cross section of the rear-side load transmission portion 85 is configured to match a shape of a cabin-inside face of the load transmission portion 27. The front face portion 86, the side face portion 87, and the rear face portion 88 of the rear-side load transmission portion 85 contact respective cabin-inside faces of the front face portion 27a, the side face portion 27b, and the rear face portion 27c of the lower end portion of the load transmission portion 27. Thus, the rear-side load transmission portion 85 is connected to the lower end portion of the load transmission portion 27.

A front edge portion of the rear-side load transmission portion 85 is connected to the connection face portion 84 via the front-side rib 71a, and a rear edge portion of the rear-side load transmission portion 85 is connected to the connection face portion 84 via the rear-side rib 92a. Thereby, the surface rigidity of the connection face portion 84 is improved, and also the sectional deformation of the rear-side load transmission portion 85 is suppressed.

Further, a front edge portion of the front face portion 86 of the rear-side load transmission portion 85 is integrated with an outward-side edge portion, in the vehicle width direction, of the front-side rib 71a, and a rear edge portion of the rear face portion 88 is integrated with an outward-side edge portion, in the vehicle width direction, of the rear-side rib 92a, whereby these portions are configured to be thick. Thereby, the surface rigidity of the front face portion 86 and the rear face portion 88 is increased.

The side face portion 87 of the rear-side load transmission portion 85 forms an open cross section which opens inward together with the front-side rib 71a and the rear-side rib 92a. This open cross section formed by the side face portion 87, the front-side rib 71a, and the rear-side rib 92a is integrated with the open cross section of the rear-side load transmission portion 85 so that these are continuous in the vehicle vertical direction. Thus, the ribs 71a, 92a can perform, together with the rear-side load transmission portion 85, the function of load transmission from the connection face portion 84 to the upward side of the vehicle body.

Moreover, the rear-side load transmission portion 85 is supported by a pair of front-and-rear ribs 71a, 92a from the inward side, in the vehicle width direction, of the vehicle body, so that deformation that the rear-side load transmission portion 85 falls down toward the inward side, in the vehicle width direction, of the vehicle body relatively to the connection face portion 84 is effectively suppressed. Therefore, a connection state of the rear-side load transmission portion 85 to the load transmission portion 27 of the wheel house inner 26 is maintained properly.

As shown in FIG. 11, the suspension housing 50 is joined to the wheel house inner 26 at a joint portion R1 which is adjacent to a forward side of the rear-side load transmission portion 85 and a joint portion R5 which is adjacent to a rearward side of the rear-side load transmission portion 85 by the SPR, for example. Thus, relative displacement of the rear-side load transmission portion 85 to the lower end portion of the load transmission portion 27 of the wheel house inner 26 is effectively suppressed, so that the connection state of the rear-side load transmission portion 85 to the lower end portion of the load transmission portion 27 of the wheel house inner 26 is maintained properly.

As described above, the support face portion 52 of the suspension housing 50 is connected to the load transmission portion 27 of the wheel housing inner 26 via the connection face portion 84 and the rear-side load transmission portion 85. Accordingly, the loads inputted to the support face portion 52 of the suspension housing 50 from the suspension 40 is effectively transmitted to the load transmission portion 27 of the wheel house inner 26 by way of the connection face portion 84 and the rear-side load connection portion 85.

Further, since the connection face portion 84 and the rear-side load transmission portion 85 are supported by the lower-side extension portion 90 from the downward side of the vehicle body, deformation of the connection face portion 84 and the displacement of the rear-side load transmission portion 85 are effectively suppressed. Accordingly, the load transmission from the support face portion 52 to the load transmission portion 27 of the wheel house inner 26 by way of the connection face portion 84 and the rear-side load transmission portion 85 can be effectively attained.

Figure 16:
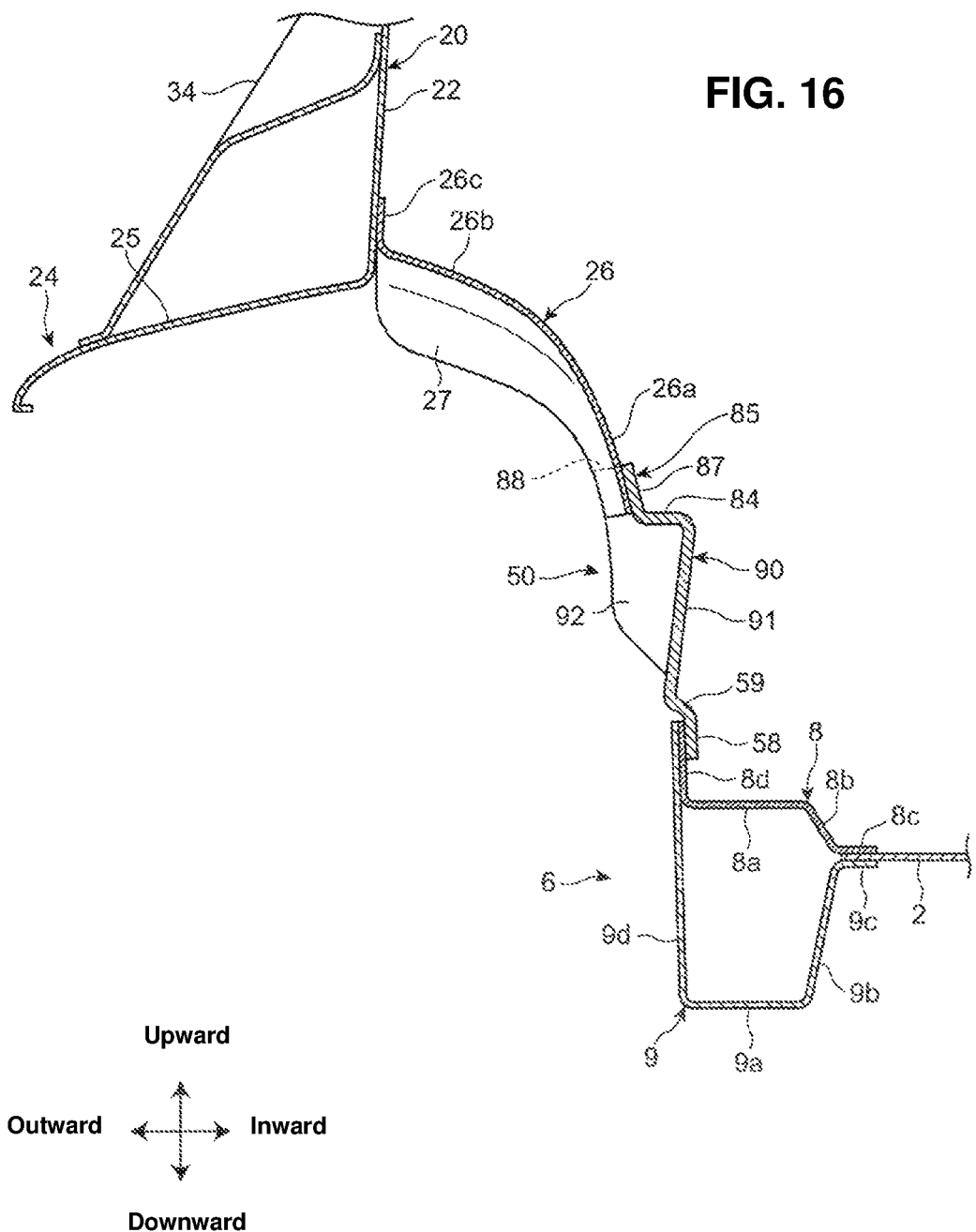
FIG. 16 is a sectional view taken along line H-H of the rear-side load transmission portion of the suspension housing and its surrounding portion shown in FIG. 1, when viewed from the forward side of the vehicle body.

Further, as shown in FIG. 16, the load transmission portion 27 of the wheel house inner 26 connects the rear-side load transmission portion 85 of the suspension housing 50 and the lower end portion of the above-described outward-side reinforcing member 34 which extends upward from the wheel house 24. Accordingly, the load transmitted to the wheel house inner 26 from the suspension housing 50 is effectively transmitted to the upper side of the vehicle body by way of the outward-side reinforcing member 34.

Operations/Effects of First Embodiment

According to the suspension housing 50 configured above, since the support face portion 52 is reinforced by the peripheral wall portion 62, the front wall portion 63, and the rear wall portion 64 from the downward side of the vehicle body, the surface rigidity of the support face portion 52 is increased. Further, since the load inputted to the support face portion 52 from the damper 41 of the suspension 40 and the load inputted to the spring receiving portion 72 from the coil spring 44 of the suspension 40 are transmitted to the vehicle-body lower portion, such as the cross member 5 and the side frame 6, by way of the front-side load transmission portion 80 and the brace portion 77 and also transmitted to the vehicle-body upper portion, such as the D pillar 14, by way of the rear-side load transmission portion 85, the load transmission portion 27 of the wheel house 24, and the outward-side reinforcing member 34, these loads are effectively dispersed to respective portions of the vehicle-body rear portion. Accordingly, local deformation which may be caused by the load concentration on the support face portion 52 of the suspension housing 50 during bumping of the rear wheel can be suppressed effectively.

Further, since the load inputted to the spring receiving portion 72 of the suspension housing 50 from the coil spring 44 is dispersed to the upward side of the vehicle body by way of the peripheral wall portion 62 and the vertical wall portion 60, the local deformation of the spring receiving portion 72 caused by a stress concentration can be suppressed.

Accordingly, even if the loads, including an inward directional component, are inputted to the support face portion 52 and the spring receiving portion 72 of the suspension housing 50 from the damper 41 and the coil spring 44 of the suspension 40, a stress concentration on the support face portion 52 and the spring receiving portion 72 by the loads is suppressed, so that it can be effectively refrained that the suspension housing 50 falls down toward the cabin inside (inward falling-down deformation).

Moreover, since the spring receiving portion 72 is connected to the side frame 6 via the connecting members 101, 102, respective moves of the spring receiving portion 72 and the side frame 6 are integrated. Accordingly, relative displacement of the spring receiving portion 72 to the side frame 6 is suppressed during bumping of the rear wheel, so that the inward falling-down deformation of the suspension housing 50 can be suppressed more effectively.

Also, since the bump stopper 48 of the suspension 40 can be housed by the peripheral wall portion 62 of the suspension housing 50, a bump stopper housing which is conventionally used as exclusive parts of the suspension 40 can be omitted.

Therefore, compared with a conventional vehicle-body structure in which the vertical wall portion of the suspension housing is provided to be spaced inward, in the vehicle width direction, apart from the bump-stopper housing of the suspension, the vertical wall portion 60 of the suspension housing 50 can be arranged closely to the bump stopper 48 which is positioned on the outward side, in the vehicle width direction, of the vertical wall portion 60. Accordingly, the protrusion quantity of the suspension housing 50 toward the cabin inside is so reduced that the cabin space, such as the baggage-room space, can be secured at the vehicle-body rear portion.

Embodiment 2

A rear vehicle-body structure of a vehicle according to a second embodiment will be described referring to FIGS. 17-22. Descriptions of the same structures of the second embodiment as the first embodiment are omitted here and the same reference characters are used in FIGS. 17-22.

Figure 17:
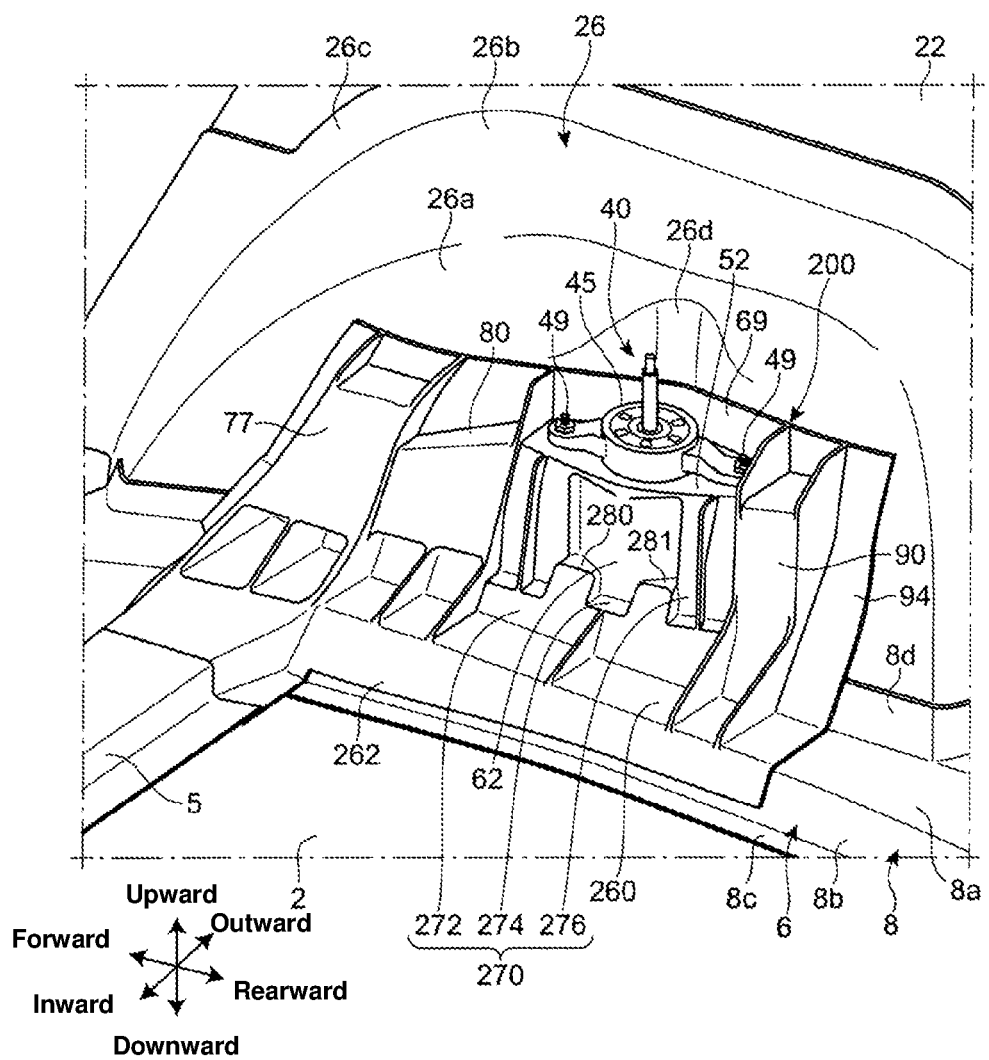
FIG. 17 is a perspective view of a rear vehicle-body structure of a vehicle according to a second embodiment of the present invention, when viewed from the inside of the cabin.
Figure 18:
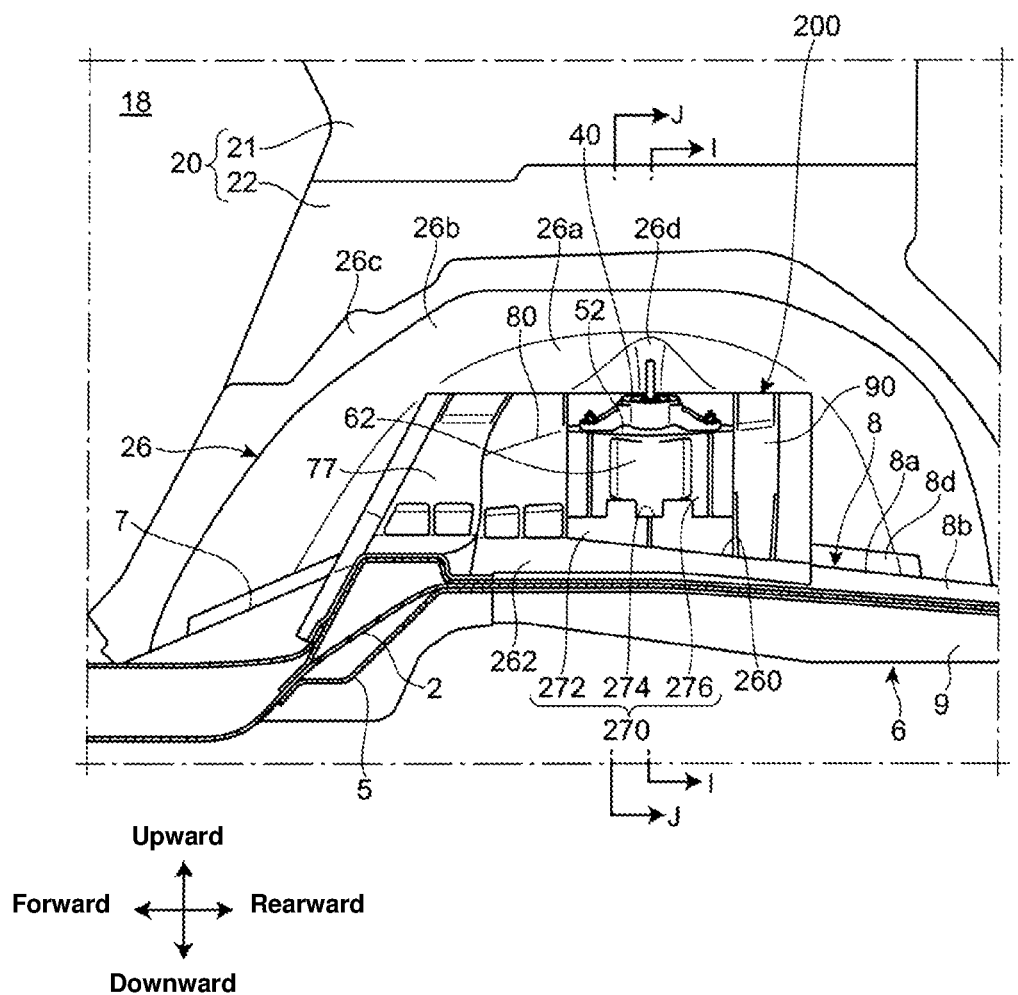
FIG. 18 is a side view of the rear vehicle-body structure, when viewed from the inside of the cabin.

As shown in the perspective view of FIG. 17 and the side view of FIG. 18, a suspension housing 200 which is different from the suspension housing 50 of the first embodiment (see FIG. 1) is used in the second embodiment.

The other structures than the suspension housing 200 in the rear vehicle-body structure of the vehicle according to the second embodiment are almost similar to the first embodiment. Herein, while the load transmission portion 27 and the upper-side brace member 38 of the first embodiment are not provided in the second embodiment, these may be provided like the first embodiment.

The structure of the suspension housing 200 of the second embodiment will be described referring to the perspective views of FIGS. 19 and 20.

The suspension housing 200 of the second embodiment is an aluminum-alloy made member which is formed by die casting, for example, like the suspension housing 50 of the first embodiment.

Similarly to the first embodiment, the suspension hosing 200 comprises the support face portion 52 for supporting the damper 41 of the suspension 40, the peripheral wall portion 62 for housing the bump stopper 48 of the suspension 40, the brace portion 77 connected to the cross member 5, the front-side load transmission portion 80 for transmitting the load to the brace member 77 from the support face portion 52, the rear-side load transmission portion 85 for transmitting the load inputted from the support face portion 52 to the rear portion of the wheel house inner 26, and the lower-side extension portion 90 for supporting the rear-side load transmission portion 85 from the downward side of the vehicle body.

Figure 19:
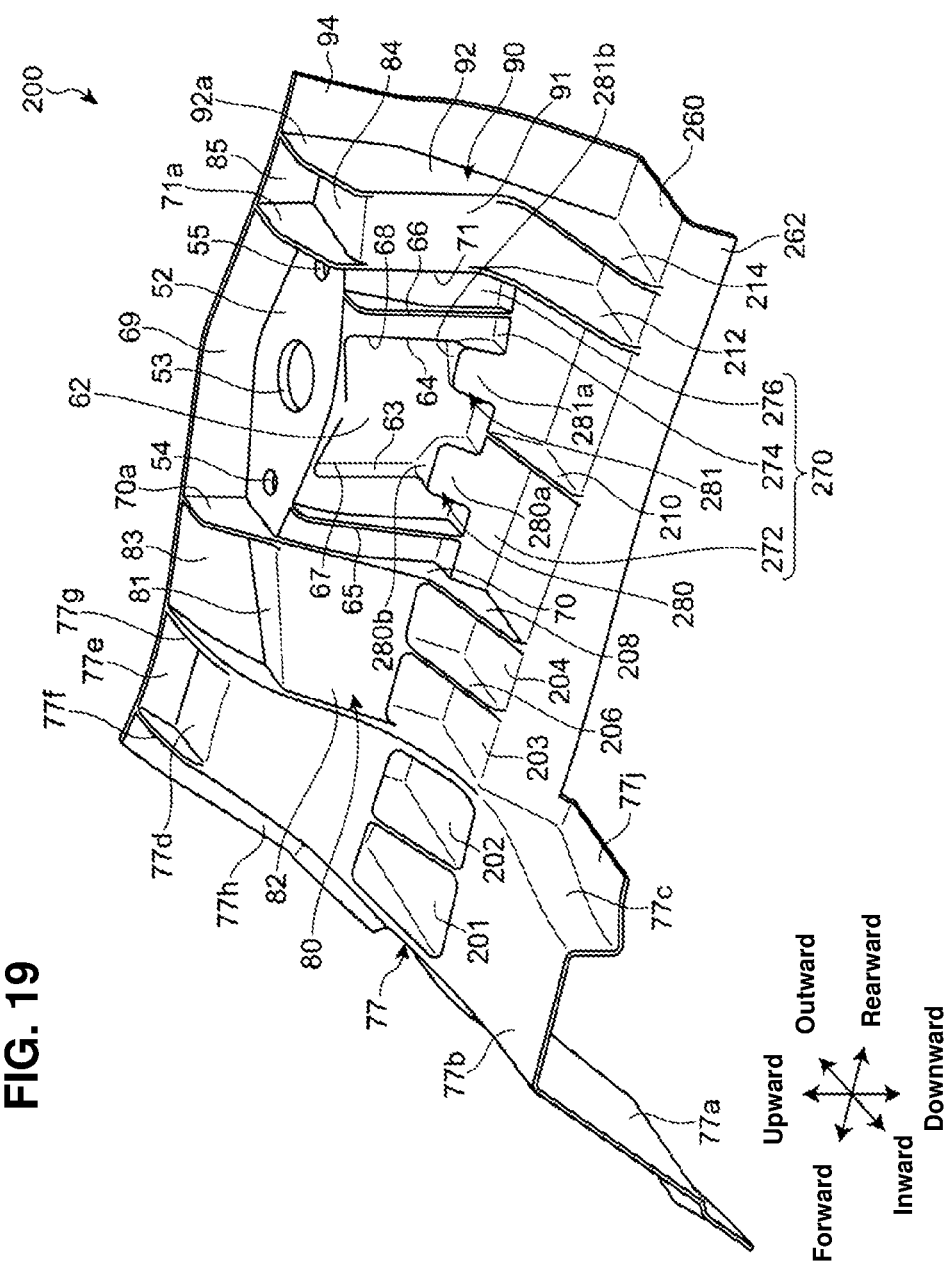
FIG. 19 is a perspective view of a suspension housing according to the second embodiment, when viewed from the obliquely-upward side inside the cabin.

As shown in FIG. 19, a pair of recess portions 201, 202 which are aligned in the vehicle longitudinal direction are provided at the side face portion 77*b* of the brace portion 77 of the second embodiment. Thereby, the rigidity of the brace portion 77 is improved. The recess portions 201, 202 are positioned at a central portion, in a longitudinal direction, of the brace portion 77. Each of the recess portions 201, 202 is configured to have a roughly rectangular contour on the side face portion 77*b*. Each peripheral wall of the recess portions 201, 202 is provided to extend outward, in the vehicle width direction, from the side face portion 77*b*.

At the front-side load transmission portion 80 of the second embodiment are provided a pair of recess portions 203, 204 which are aligned in the vehicle longitudinal direction. Thereby, the rigidity of the front-side load transmission portion 88 is improved.

The recess portions 203, 204 of the front-side load transmission portion 80 are provided to overlap the recess portions 201, 202 of the brace portion 77 in the vehicle width direction and in the vehicle vertical direction. A lower face of the recess portions 203, 204 is configured by a portion of a front-end side of an upper-face joint portion 260, which will be described. A front face of the front-side recess portion 203 is configured by the rear face portion 77*c* of the brace portion 77. A rear face of the front-side recess portion 203 and a front face of the rear-side recess portion 204 are configured by a roughly triangular rib 206 which partitions the recess portions 203, 204 in the vehicle longitudinal direction. A rear face of the rear-side recess portion 204 is configured by a roughly triangular rib 208 which faces a rearward side of the rib 206. The rib 208 is arranged on the same surface as the partitioning wall portion 70 and continuous to the partitioning wall portion 70.

Figure 20:
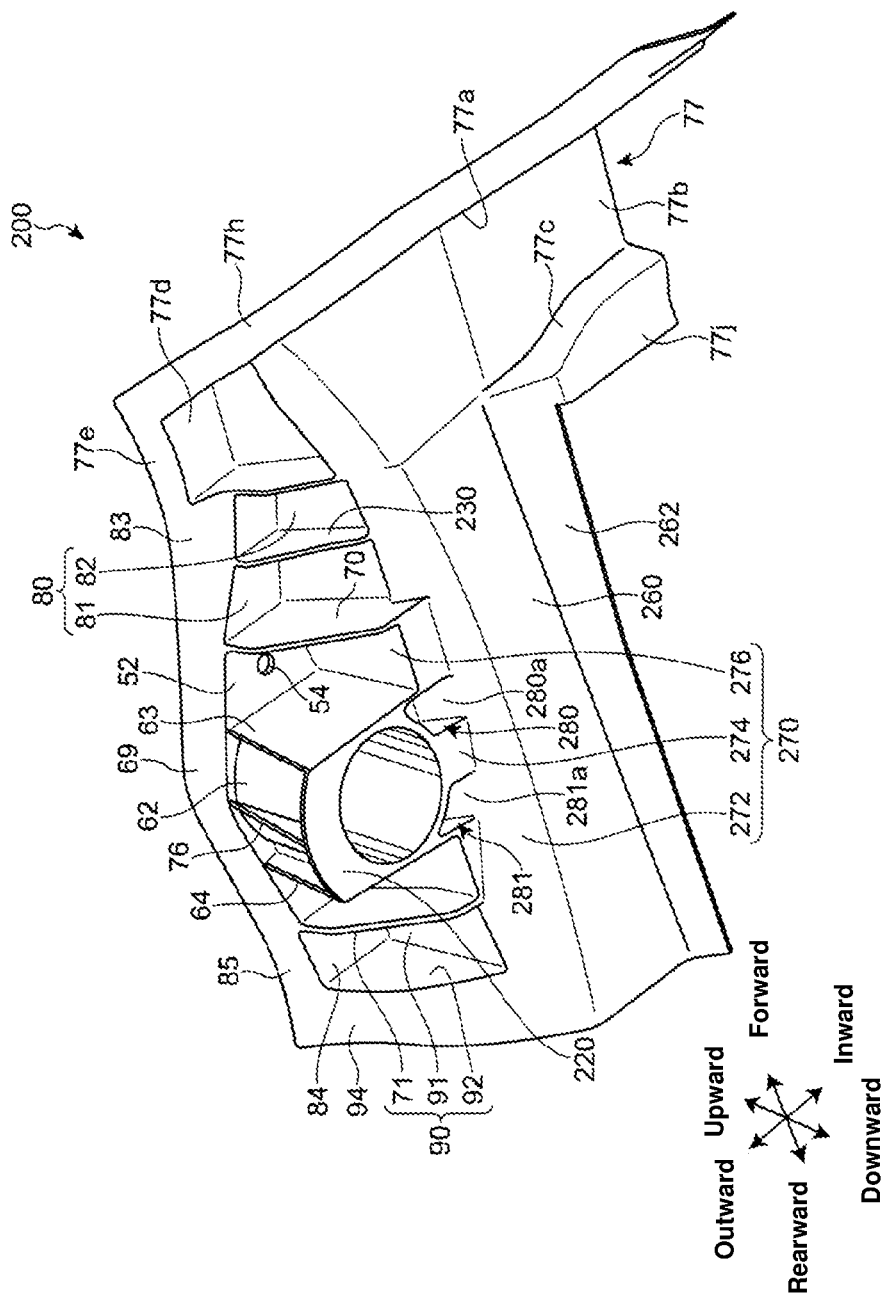
FIG. 20 is a perspective view of the suspension housing, when viewed from the obliquely-downward side outside the cabin.

As shown in FIG. 20, a roughly triangular rib 230 is provided at the front-side load transmission portion 80 between a lower face of the connection face portion 81 and an outward-side face of the side face portion 82. An inside space of the front-side load transmission portion 80 is partitioned in the vehicle longitudinal direction by the rib 230. The rib 230 is arranged on the same surface as the rib 206 partitioning the recess portions 203, 204. The rigidity of the front-side load transmission portion 80 is further improved by the rib 230.

The rear-side load transmission portion 85 of the second embodiment is configured by a flat plate portion which is arranged along a surface of the wheel house inner 26. Herein, in a case where the load transmission portion 27 which is similar to the first embodiment is provided at the wheel house inner 26, the rear-side load transmission portion 85 may be configured by a plate portion which is provided to be bent along a surface of the load transmission portion 27 similarly to the first embodiment.

A connecting structure of the support face portion 52 to the side frame 6 in the suspension housing 200 of the second embodiment is different from the first embodiment. Hereafter, this structure will be described specifically.

As shown in FIGS. 17 and 18, a connection portion of the suspension housing 200 to the side frame 6 comprises an upper-face joint portion 260 and a side-face joint portion 262 which are joined to the side frame 6 and a vertical wall portion 270 which rises upward from the upper-face joint portion 260.

The upper-face joint portion 260 is a belt-plate shaped portion which extends in the vehicle longitudinal direction along the upper face of the side frame 6. The upper-face joint portion 260 is provided to slant rearward and downward such that it matches the upper face of the side frame 6 (see FIG. 18). The upper-face joint portion 260 is joined to the upper wall portion 8*a* which forms the upper face of the side frame 6. Joining of the upper-face joint portion 260 to the upper wall portion 8*a* is conducted by the SPR, for example, at plural points which are spaced from each other in the longitudinal direction.

As shown in FIG. 19, the upper-face joint portion 260 is provided to respectively extend forward and rearward from the support face portion 52. A forward portion of the upper-face joint portion 260 from the support face portion 52 forms a lower face of the recess portions 203, 204. A rearward portion of the upper-face joint portion 260 from the support face portion 52 is continuous to a lower edge portion of the lower-side extension portion 90 and a lower edge portion of the rear-side joint face portion 94.

The side-face joint portion 262 is provided to extend downward from an inward-side edge portion, in the vehicle width direction, of the upper-face joint portion 260. The side-face joint portion 262 is provided over a roughly whole length of the upper-face joint portion 260. The side-face joint portion 262 is a belt-plate shaped portion which extends in the vehicle longitudinal direction along the inward-side wall portion 8*b* which forms an inward-side side face of the side frame 6. The side-face joint portion 262 is provided to slant upward and outward (see FIG. 21). The side-face joint portion 262 is joined to the inward-side wall portion 8*b* of the side frame 6. Joining of the side-face joint portion 262 to the inward-side wall portion 8*b* is conducted by the SPR, for example, at plural points which are spaced from each other in the longitudinal direction.

The vertical wall portion 270 is provided to rise upward from an outward-side edge portion, in the vehicle width direction, of the upper-face joint portion 260. The vertical all portion 270 has a step-shaped structure which comprises a lower-side vertical wall portion 272, a middle-level floor portion 274, and an upper-side vertical wall portion 276, and the upper-face joint portion 260 and the support face portion 52 are interconnected via this step-shaped structure.

Herein, the side face portion 82 of the front-side load transmission portion 80 which is positioned in front of the support face portion 52 and the side wall portion 91 of the lower-side extension portion 90 which is positioned in back of the support face portion 52 form a portion of the vertical wall portion 270 as well.

As shown in FIGS. 19 and 20, the lower-side vertical wall portion 272 is provided to extend upward from an outward-side edge portion, in the vehicle width direction, of the upper-face joint portion 260. The lower-side vertical wall portion 272 is provided over a roughly whole length of the upper-face joint portion 260 (see FIG. 20). A portion of a front-end side of the lower-side vertical wall portion 272 forms a cabin-outside face of the recess portions 203, 204 (see FIG. 19), and a portion of a rear-end side of the lower-side vertical wall portion 272 forms a lower end portion of the side wall portion 91 of the lower extension portion 90 and a lower end portion of the rear-side joint face portion 94. In a longitudinal area where the support face portion 52 is provided, a height (length), in a vehicle vertical direction, of the lower-side vertical wall portion 272 becomes greater gradually toward a rearward side of the vehicle body.

Figure 21:
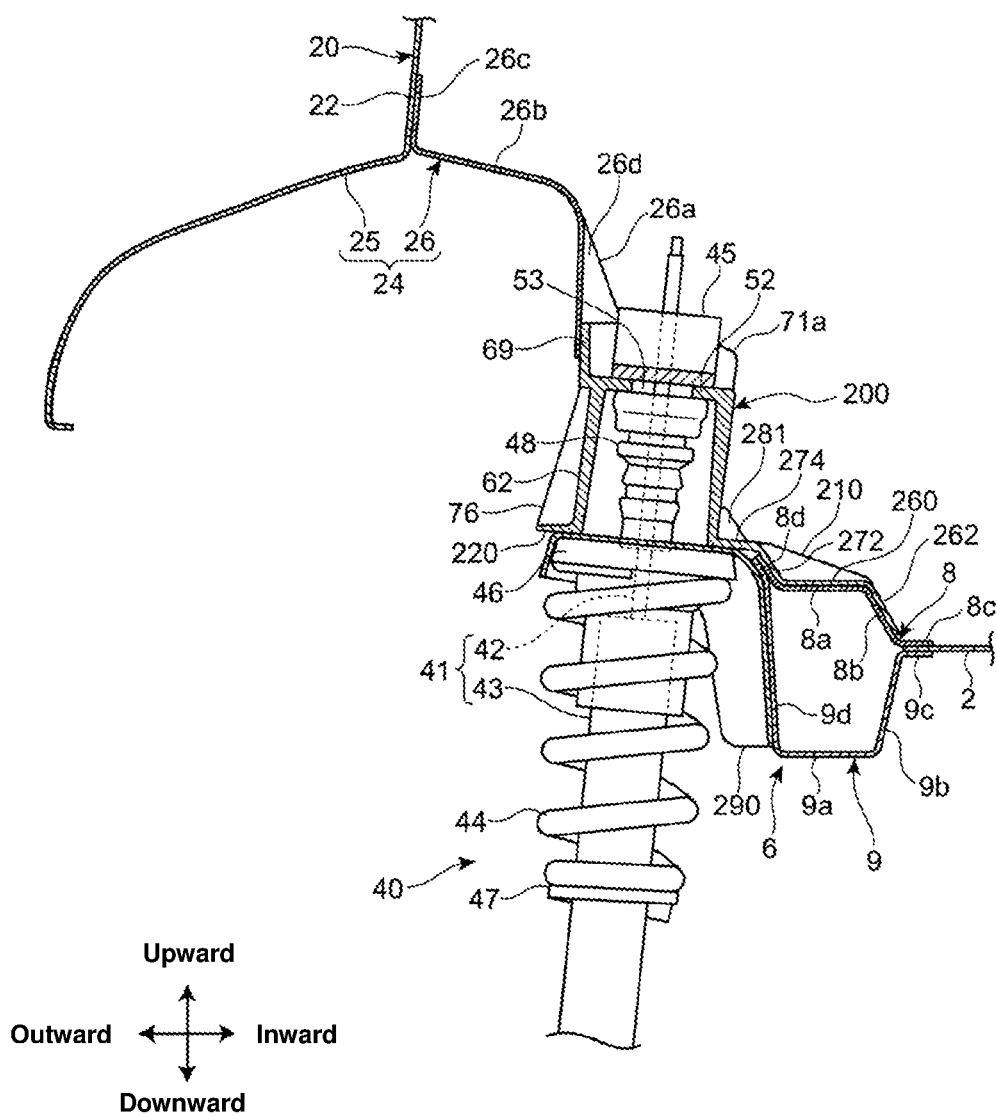
FIG. 21 is a sectional view of the rear vehicle-body structure according to the second embodiment taken along line I-I of FIG. 18, when viewed from the forward side of the vehicle body.
Figure 22:
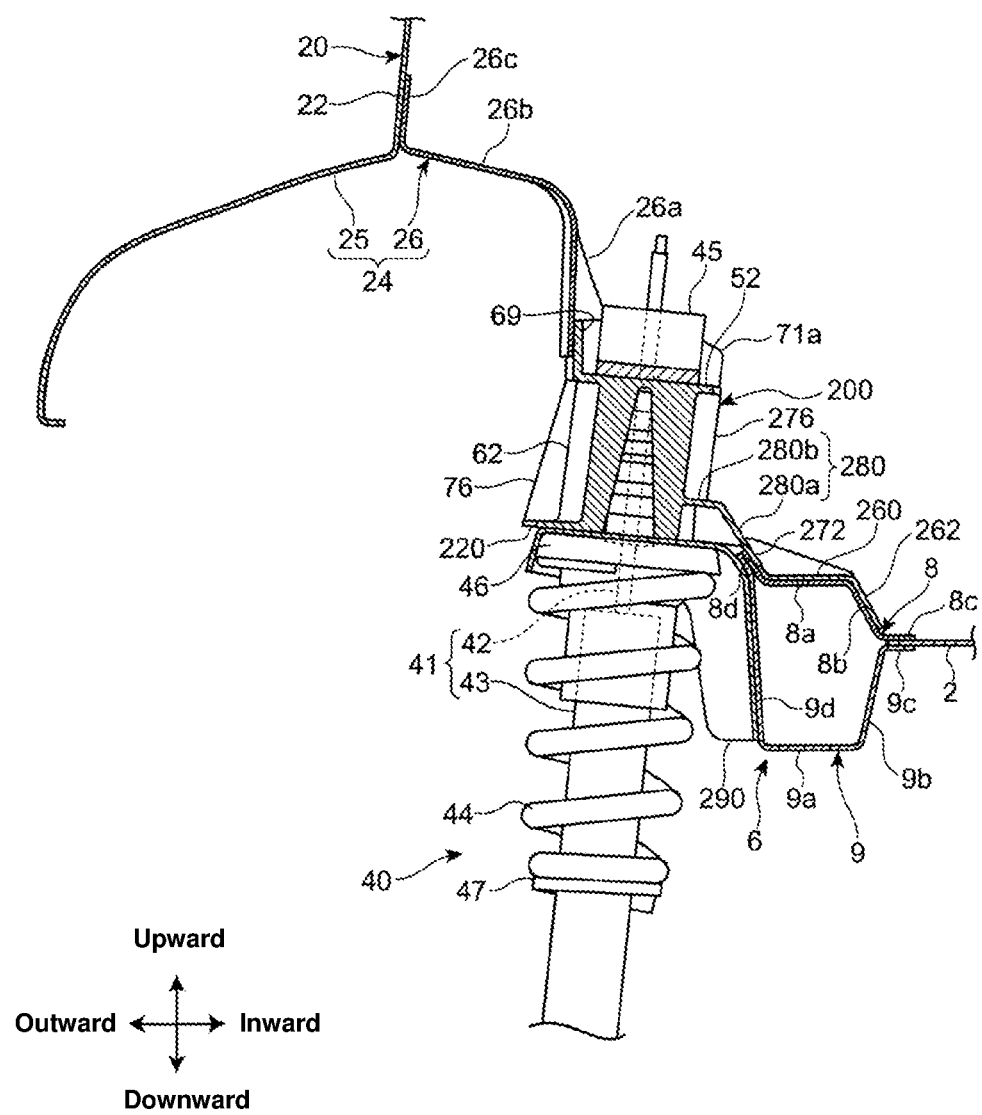
FIG. 22 is a sectional view of the rear vehicle-body structure taken along line J-J of FIG. 18, when viewed from the forward side of the vehicle body.

As shown in the sectional view of FIG. 21, the lower-side vertical wall portion 272 is provided to slant upward and outward. The lower-side vertical wall portion 272 is joined to the outward-side wall portions 8d, 9d of the side frame 6 by the SPR, for example.

As shown in FIG. 19, the suspension housing 200 comprises plural ribs 206, 208, 210, 212, 214 as a high rigidity which is provided at an area from the upper-face joint portion 260 to the lower-side vertical wall portion 272. These ribs 206, 208, 210, 212, 214 are provided to be spaced apart from each other in a longitudinal direction of the upper-face joint portion 260 and perpendicular to the longitudinal direction of the upper-face joint portion 260, respectively. The ribs 206, 208, 210, 212, 214 are of a roughly triangular shape, when viewed from the vehicle longitudinal direction.

The two front-side ribs 206, 208 configure the above-described recess portions 203, 204. The central rib 210 is arranged substantially at the same position, in the vehicle longitudinal direction, as the axis center of the peripheral wall portion 62, that is, at a longitudinal position between a pair of rising portions 280, 281. The two rear-side ribs 212, 214 are provided at a position, in the vehicle longitudinal direction, which corresponds to the lower-side extension portion 90. More specifically, the rib 212 connects the front edge portion of the side wall portion 91 of the lower-side extension portion 90 and the upper-face joint portion 260, and the rib 214 connects the rear edge portion of the side wall portion 91 and the upper-face joint portion 260.

The ribs 206, 208, 210, 212, 214 are connected to a roughly whole portion, in the vehicle width direction, of the upper-face joint portion 260 and a roughly whole portion, in the vehicle vertical direction, of the lower-side vertical wall portion 272 at their longitudinal positons.

The middle-level floor portion 274 is provided to extend outward, in the vehicle width direction, from an upper edge portion of the lower-side vertical wall portion 272. The middle-level floor portion 274 is provided in an area between the pair of partitioning wall portions 70, 71. The middle-level floor portion 274 is arranged substantially in parallel to a vehicle-body horizontal direction (see FIG. 18).

As shown in FIG. 20, a portion of the middle-level floor portion 274 is a spring receiving portion 220 for receiving the coil spring 44 of the suspension 40 from the upward side of the vehicle body. The spring receiving portion 220 is provided to protrude outward from a central portion, in the vehicle longitudinal direction, of the middle-level floor portion 274.

The spring receiving portion 220 protrudes toward both sides, in the vehicle width direction, from the lower edge portion of the peripheral wall portion 62. Thus, the middle-level floor portion 274 is continuous to the lower edge portion of the peripheral wall portion 62 at the spring receiving portion 220. A front edge portion of the spring receiving portion 220 is configured by the lower edge portion of the front wall portion 63, and a rear edge portion of the spring receiving portion 220 is configured by the lower edge portion of the rear wall portion 64.

As shown in FIG. 21, the upper end portion of the coil spring 44 is supported at the spring receiving portion 220 via a coil-spring seat 290 and the seat rubber 46, for example. The coil spring seat 290 is made by pressing a metal plate, such as a steel plate, for example, and joined to the spring receiving portion 220 by the SPR, for example.

Herein, the coil spring seat 290 may be joined to the side frame 6 by welding, for example. In this case, since the spring receiving portion 220 is connected to the side frame 6 via the coil spring seat 290, respective moves of the spring receiving portion 220 and the side frame 6 when a load is inputted to the spring receiving portion 220 from the coil spring 44 are integrated.

As shown in FIGS. 19 and 20, the middle-level floor portion 274 comprises a pair of rising portions 280, 281 which are configured such that a portion of the spring receiving portion 220 rises, respectively. The rising portions 280, 281 are arranged adjacently to an inward side, in the vehicle of the peripheral wall portion 62. The riding portions 280, 281 are provided to be spaced apart from each other in the vehicle longitudinal direction.

The front-side rising portion 280 is provided in front of the axial center of the peripheral wall portion 62, and a front edge portion of the rising portion 280 is arranged along the front wall portion 63. The rear-side rising portion 281 is provided in back of the axial center of the peripheral wall portion 62, and a rear edge portion of the rising portion 281 is arranged along the rear wall portion 64.

The rising portions 280, 281 are respectively a stand-like portion which opens downward (see FIG. 20). Inward-side side faces of the rising portions 280, 281 are configured by upward extension portions 280a, 281a of the lower-side vertical wall portion 272. The upward extension portions 280a, 281a are configured such that the lower-side vertical wall portion 272 extends upward straightly beyond the middle-level floor portion 274. That is, these portions 280a, 281a are respectively configured as a slant face which slants upward and outward (see FIG. 22).

Outward-side side faces of the rising portions 280, 281 are configured by a portion of the peripheral wall portion 62. Upper face portions 280b, 281b of the rising portions 280, 281 are arranged substantially vertically to the axis center of the peripheral wall portion 62. Outward-side edge portions of the upper face portions 280b, 281b are provided along an outer peripheral face of the peripheral wall portion 62. A front edge portion of the upper face portion 280b of the front-side rising portion 280 is arranged along the front wall portion 63, and a rear edge portion of the upper face portion 281a of the rear-side rising portion 281 is arranged along the rear wall portion 64.

The vertical wall portion 270 further comprises an upper-side vertical wall portion 276 which extends upward from respective outward-side edge portions of a forward-side portion and a rearward-side portion of the middle-level floor portion 274 which are respectively positioned in front of and in back of the peripheral wall portion up to the inward-side edge portion of the support face portion 52. The upper-side vertical wall portion 276 is configured such that it is divided, in the vehicle longitudinal direction, into two parts, interposing the peripheral wall portion 62 between the two parts. The fronts-side part of the upper-side vertical wall portion 276 is provided with the front-side rib 65 like the first embodiment, and the rear-side part of the upper-side vertical wall portion 276 is provided with the rear-side rib 66 like the first embodiment.

Operations/Effects of Second Embodiment

In the suspension housing 200 of the second embodiment as well, since the support face portion 52 is reinforced by the peripheral wall portion 62 and the upper-side vertical wall portion 276 from the downward side of the vehicle body, the surface rigidity of the support face portion 52 is increased. Further, a load inputted to the support face portion 52 from the damper 41 of the suspension 40 and a load inputted to the spring receiving portion 220 from the coil spring 44 of the suspension 40 can be effectively dispersed to respective portions of the vehicle-body rear portion. Accordingly, local deformation which may be caused by the load concentration on the support face portion 52 of the suspension housing 200 during bumping of the rear wheel can be suppressed effectively.

Further, since the load inputted to the spring receiving portion 220 of the suspension housing 200 from the coil spring 44 is dispersed to the upward side of the vehicle body by way of the peripheral wall portion 62 and the upper-side vertical wall portion 276, the local deformation of the spring receiving portion 220 caused by the stress concentration can be suppressed.

Accordingly, even if the loads, including the inward directional component, are inputted to the support face portion 52 and the spring receiving portion 220 of the suspension housing 200 from the damper 41 and the coil spring 44 of the suspension 40, a stress concentration on the support face portion 52 and the spring receiving portion 220 by the loads is suppressed, so that it can be effectively suppressed that the suspension housing 220 falls down toward the cabin inside (inward falling-down deformation).

Further, since the bump stopper 48 of the suspension 40 can be housed by the peripheral wall portion 62 of the suspension housing 200 in the second embodiment as well, the bump-stopper housing which is conventionally used as exclusive parts of the suspension 40 can be omitted.

Therefore, compared with the conventional vehicle-body structure in which the vertical wall portion of the suspension housing is provided to be spaced inward, in the vehicle width direction, apart from the bump-stopper housing of the suspension, the vertical wall portion 270 of the suspension housing 200 can be arranged closely to the bump stopper 48 which is positioned on the outward side, in the vehicle width direction, of the vertical wall portion 270. Accordingly, the protrusion quantity of the suspension housing 200 toward the cabin inside is so reduced that the cabin space, such as the baggage-room space, can be secured at the vehicle-body rear portion.

Moreover, since the upper-face joint portion 260 and the side-face joint portion 262 of the suspension housing 200 are joined to the upper face and the side face of the side frame 6 in the second embodiment, the suspension housing 200 can be securely connected to the side frame 6, and relative displacement of the suspension housing 200 to the side frame 6 can be effectively controlled (restricted).

Also, the lower-side vertical wall portion 272 of the suspension housing 200 is provided to slant upward and outward, and the plural ribs 206, 208, 210, 212, 214 are provided at the area from the upper-face joint portion 260 to the lower-side vertical wall portion 272. Accordingly, bending deformation of the suspension housing 200 at the corner portion between the upper-face joint portion 260 and the lower-side vertical wall portion 272 can be effectively suppressed.

Further, the pair of rising portions 280, 281 which are provided at the area from the middle-level floor portion 274 to the peripheral wall portion 62 of the suspension housing 200 serve as the reinforcing portion, so that bending deformation of the suspension housing 200 at the corner portion between the middle-level floor portion 274 and the lower edge portion of the peripheral wall portion 62 can be effectively suppressed. Moreover, inward displacement of a portion of the suspension housing 200 which is positioned on the upward side of the lower-side vertical wall portion 272 can be effectively controlled (restricted) by the lower-side vertical wall portion 272 which slants upward and outward.

According to the second embodiment described above, the inward falling-down deformation of the suspension housing 200 can be effectively suppressed.

While the above-described embodiments have been described for the present invention, the present invention is not to be limited to these embodiments.

For example, while the above-described embodiment shows the example where the connecting members 101, 102 (see FIG. 12) connecting the spring receiving portions 72, 220 of the suspension housings 50, 200 to the side frame 6 and the coil spring 290 (see FIG. 21) are separate members from the suspension housings 50, 200, the spring receiving portions 72, 220 may be connected to the side frame 6 via a connection portion provided integrally with the suspension housings 50, 200.

Also, while the above-described embodiment shows the example where the front-side load transmission portion 80 which transmits the load from the support face portion 52 to the brace portion 77 has the L-shaped open cross section which opens outward (see FIG. 10) in the suspension housings 50, 200, the shape of the cross section of the front-side load transmission 80 is not limited to this, but an open cross section opening inward or a closed cross section are applicable, for example.

Further, while the above-described embodiment shows the example where the suspension housings 50, 200 are made of aluminum alloy, the material of the suspension housing 50 is not limited to this, but any other metal than the aluminum alloy, CFR (carbon fiber reinforced plastic), or the like are applicable. Moreover, the suspension housings 50, 200 are not limited to a die-casting formed product, but a cast product, a forged product, a press-formed product or the like are applicable. Also, the suspension housings 50, 200 are not necessarily formed integrally, but it may be formed by joining plural parts.

Moreover, while the load transmission portion 27 of the wheel house 24 of the above-described first embodiment is configured by the wheel house inner 26 (see FIGS. 13-16), it may be configured by the wheel house inner 26 and an additional member which is attached to the wheel house inner 26 or only by the member attached to the wheel house inner 26. Additionally, while the load transmission portion 27 of the above-described first embodiment is configured to have the open cross section over its whole length, a portion or a whole part of the load transmission portion 27 may be configured to have a closed cross section.

Since the present invention provides the rear vehicle-body structure which can effectively disperse the input loads from the suspension and also properly secure the cabin space, it is properly applicable to a manufacturing industry field of an automotive vehicle which comprises this type of vehicle-body structure.

What is claimed is:
1. A rear vehicle-body structure of a vehicle, comprising:
a wheel house provided at a side face portion of a vehicle-body rear portion;
a side frame extending in a vehicle longitudinal direction on an inward side, in a vehicle width direction, of the wheel house;
a suspension comprising a damper provided to extend in a vehicle vertical direction for damping a vertical load inputted from a wheel thereto and a bump stopper provided on a shaft center of the damper; and
a suspension housing including a support face portion for supporting the damper and provided to connect the side frame and the wheel house, wherein said suspension housing comprises a peripheral wall portion which is provided to extend downward from said support face portion and enclose said bump stopper at least partially, and wherein said suspension housing comprises a front wall portion and a rear wall portion which respectively extend downward from said support face portion, said front wall portion is arranged along a tangential direction at a front end of said peripheral wall portion, when viewed from an axial direction of said peripheral wall portion, and said rear wall portion is arranged along a tangential direction at a rear end of the peripheral wall portion, when viewed from the axial direction of the peripheral wall portion.

2. The rear vehicle-body structure of the vehicle of claim 1, wherein said peripheral wall portion is of a cylindrical shape which extends in the vehicle vertical direction.

3. A rear vehicle-body structure of a vehicle, comprising:
a wheel house provided at a side face portion of a vehicle-body rear portion;
a side frame extending in a vehicle longitudinal direction on an inward side, in a vehicle width direction, of the wheel house;
a suspension comprising a damper provided to extend in a vehicle vertical direction for damping a vertical load inputted from a wheel thereto and a bump stopper provided on a shaft center of the damper; and
a suspension housing including a support face portion for supporting the damper and provided to connect the side frame and the wheel house,
wherein said suspension housing comprises a peripheral wall portion which is provided to extend downward from said support face portion and enclose said bump stopper at least partially,
wherein said suspension comprises a spring which is arranged around said damper, and a spring receiving portion for supporting an upper end portion of the damper is provided at a lower end portion of said peripheral wall portion, and
wherein said spring receiving portion is provided to expand radially outside from a lower edge of said peripheral wall portion in a flange shape, and a high-rigidity portion is provided along a peripheral edge portion of said spring receiving portion.

4. The rear vehicle-body structure of the vehicle of claim 3, wherein a connection portion of said suspension housing to said side frame includes an upper-face joint portion which is joined to an upper face of the side frame.

5. The rear vehicle-body structure of the vehicle of claim 4, wherein said suspension housing further comprises a vertical wall portion which extends upward from an outward-side edge portion, in the vehicle width direction, of said upper-face joint portion up to an inward-side edge portion, in the vehicle width direction, of said support face portion and a high-rigidity portion which is provided at an area from the upper-face joint portion to said vertical wall portion.

6. The rear vehicle-body structure of the vehicle of claim 5, wherein said vertical wall portion comprises a lower-side vertical wall portion which extends upward from the outward-side edge portion, in the vehicle width direction, of said upper-face joint portion, a middle-level floor portion which extends outward, in the vehicle width direction, from an upper edge portion of said lower-side vertical wall portion and is continuous to a lower edge portion of said peripheral wall portion, an upper-side vertical wall portion which extends upward from said middle-level floor portion up to the support face portion, and a reinforcing portion which is provided at an area from the middle-level floor portion to an outer peripheral face of the peripheral wall portion.

7. The rear vehicle-body structure of the vehicle of claim 6, wherein said lower-side vertical wall portion is provided to slant upward and outward.

8. The rear vehicle-body structure of the vehicle of claim 7, wherein a portion of said middle-level floor portion is a spring receiving portion for receiving a spring of said suspension from an upward side of a vehicle body, and said reinforcing portion is a rising portion which is configured such that a portion of said spring receiving portion rises.

9. The rear vehicle-body structure of the vehicle of claim 8, wherein said lower-side vertical wall portion includes an upward extension portion which extends upward beyond said middle-level floor portion and forms a portion of said rising portion.

10. A rear vehicle-body structure of a vehicle, comprising:
a wheel house provided at a side face portion of a vehicle-body rear portion;
a side frame extending in a vehicle longitudinal direction on an inward side, in a vehicle width direction, of the wheel house;
a suspension comprising a damper provided to extend in a vehicle vertical direction for damping a vertical load inputted from a wheel thereto, a bump stopper provided on a shaft center of the damper, and a spring arranged around the damper; and
a suspension housing including a support face portion for supporting the damper and provided to connect the side frame and the wheel house,
wherein said suspension housing comprises a peripheral wall portion which is provided to extend downward from said support face portion and enclose said bump stopper at least partially, the peripheral wall portion being of a cylindrical shape which extends in the vehicle vertical direction,
said suspension housing further comprises a front wall portion and a rear wall portion which respectively extend downward from said support face portion, said front wall portion is arranged along a tangential direction at a front end of said peripheral wall portion, when viewed from an axial direction of said peripheral wall portion, and said rear wall portion is arranged along a tangential direction at a rear end of the peripheral wall portion, when viewed from the axial direction of the peripheral wall portion, and
a spring receiving portion for supporting an upper end portion of the damper is provided at a lower end portion of said peripheral wall portion.

11. A rear vehicle-body structure of a vehicle, comprising:
a wheel house provided at a side face portion of a vehicle-body rear portion;
a side frame extending in a vehicle longitudinal direction on an inward side, in a vehicle width direction, of the wheel house;
a suspension comprising a damper provided to extend in a vehicle vertical direction for damping a vertical load inputted from a wheel thereto and a bump stopper provided on a shaft center of the damper; and
a suspension housing including a support face portion for supporting the damper and provided to connect the side frame and the wheel house,
wherein said suspension housing comprises a peripheral wall portion which is provided to extend downward from said support face portion and enclose said bump stopper at least partially, and a connection portion of said suspension housing to said side frame includes an upper-face joint portion which is joined to an upper face of the side frame.

12. The rear vehicle-body structure of the vehicle of claim 11, wherein said suspension housing further comprises a vertical wall portion which extends upward from an outward-side edge portion, in the vehicle width direction, of said upper-face joint portion up to an inward-side edge portion, in the vehicle width direction, of said support face portion and a high-rigidity portion which is provided at an area from the upper-face joint portion to said vertical wall portion.

13. The rear vehicle-body structure of the vehicle of claim 12, wherein said vertical wall portion comprises a lower-side vertical wall portion which extends upward from the outward-side edge portion, in the vehicle width direction, of said upper-face joint portion, a middle-level floor portion which extends outward, in the vehicle width direction, from an upper edge portion of said lower-side vertical wall portion and is continuous to a lower edge portion of said peripheral wall portion, an upper-side vertical wall portion which extends upward from said middle-level floor portion up to the support face portion, and a reinforcing portion which is provided at an area from the middle-level floor portion to an outer peripheral face of the peripheral wall portion.

14. The rear vehicle-body structure of the vehicle of claim 13, wherein said lower-side vertical wall portion is provided to slant upward and outward.

15. The rear vehicle-body structure of the vehicle of claim 14, wherein a portion of said middle-level floor portion is a spring receiving portion for receiving a spring of said suspension from an upward side of a vehicle body, and said reinforcing portion is a rising portion which is configured such that a portion of said spring receiving portion rises.

16. The rear vehicle-body structure of the vehicle of claim 15, wherein said lower-side vertical wall portion includes an upward extension portion which extends upward beyond said middle-level floor portion and forms a portion of said rising portion.

* * * * *